(12) United States Patent
Richter et al.

(10) Patent No.: US 7,304,753 B1
(45) Date of Patent: Dec. 4, 2007

(54) SYSTEMS FOR PRINT JOB MONITORING

(75) Inventors: Bradley S. Richter, Belmont, CA (US); Rafi Holtzman, San Mateo, CA (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

(21) Appl. No.: 09/267,223

(22) Filed: Mar. 11, 1999

(51) Int. Cl.
G06F 15/00 (2006.01)
G06F 3/12 (2006.01)

(52) U.S. Cl. ..................... 358/1.15; 358/1.14

(58) Field of Classification Search ............... 358/1.1, 358/1.9, 1.13, 1.14, 1.15, 296, 407; 709/200, 709/201, 202, 203, 217, 220, 242, 244
See application file for complete search history.

(56) References Cited

U.S. PATENT DOCUMENTS

| | | | | |
|---|---|---|---|---|
| 5,287,194 A | * | 2/1994 | Lobiondo | 358/296 |
| 5,580,177 A | | 12/1996 | Gase et al. | 400/61 |
| 5,699,494 A | * | 12/1997 | Colbert et al. | 358/1.15 |
| 5,862,404 A | * | 1/1999 | Onaga | 395/828 |
| 5,933,584 A | * | 8/1999 | Maniwa | 358/1.15 |
| 5,958,012 A | * | 9/1999 | Battat et al. | 709/224 |
| 5,978,560 A | * | 11/1999 | Tan et al. | 358/1.15 |
| 6,047,197 A | * | 4/2000 | Jarrad | 455/566 |
| 6,088,451 A | * | 7/2000 | He et al. | 380/25 |
| 6,182,225 B1 | * | 1/2001 | Hagiuda et al. | 713/201 |
| 6,292,267 B1 | * | 9/2001 | Mori et al. | 358/1.15 |
| 6,678,068 B1 | | 1/2004 | Richter et al. | |
| 2002/0048034 A1 | * | 4/2002 | Matoba | 358/1.13 |

FOREIGN PATENT DOCUMENTS

EP 0575168 A2 * 12/1993
EP 859 309 8/1998

* cited by examiner

Primary Examiner—Gabriel I. Garcia
(74) Attorney, Agent, or Firm—James Trosino

(57) ABSTRACT

A client print server link is provided, which uses two-way communication between a client computer and a printing system typically having networked output devices and print servers. The client print server link provides detailed information regarding each print server and connected device within a printing system. The client print server link allows a client user at a client computer to access information and control each of their print jobs quickly and efficiently within a single application, without requiring the user to access a plurality of separate utilities. The client print server link groups and displays information that is relevant to print jobs sent by a single client user to one or more all connected print servers and output peripheral devices. An administrative print server link is also provided, which also uses two-way communication between a computer and a networked printing system. The administrative print server link provides detailed system information and control for multiple client users, print servers and output devices.

8 Claims, 20 Drawing Sheets

SYSTEMS FOR PRINT JOB MONITORING

FIELD OF THE INVENTION

The invention relates to the field of control and display interfaces for remote output peripherals. More particularly, the invention relates to client user and administrative user print server interfaces for remote printing or copying devices.

BACKGROUND OF THE INVENTION

Separate chooser and print driver applications are typically used by a user at a client computer to control and print a print job at a remote peripheral device, such as a copier or printer. If it is necessary to change destination printers within a network having more than one output device, the client user typically navigates through a chooser application to choose the destination peripheral, exits the chooser application, and then navigates back through an active application in which a desired print job is open.

The user then chooses print options, such as paper size and page orientation, from a page setup menu of the print driver application. The client user then selectively sends all or part of the file to be printed, typically by navigating through a print window of the print driver from within the active application.

A chooser application typically consists of a list of selectable destination printers, whereby each printer has a feature set of printer options and capabilities, such as desired print speed, print quality, available paper sizes, color, stapling and binding options, duplexing, sorting, and printer locality.

However, information regarding the feature sets of connected print servers and output devices is typically accessed through a printer driver on the client computer. For example, a printer driver may have access to toner information from an inkjet printer.

When a user sends a print job to be printed from within an active application, the printer driver appears, wherein the user selectively sets page printing options, such as which pages are to be printed by the destination printer (which was chosen in a separate chooser application). Some printer driver interfaces include information regarding the connected output device, such as toner levels, which can be transferred to the client computer through a two-way computer-printer protocol (e.g. SNMP). When the user activates the print-driver application, the print driver queries the selected printer for toner levels, and then displays the toner level information through the printer driver interface.

In the prior art, the user only sees such information when the print driver is activated, typically at the time the user is attempting to send a print job to an output device. As well, such information is only displayed for one output device at a time. For a print driver application, therefore, there is an established connection to a specific printer (which has been pre-specified in a chooser application), and the client user views information regarding the specific printer, and selects options, from within the print driver, before sending the print job to the specified printer.

When a client user invokes the printing process at a client computer, a print driver is typically activated. The printer driver allows the user to select a union of print options from a superset of all available features for the specified printer. Within the print driver or PPD file, there is typically a list of options which the pre selected printer supports. For example, when a user hits a "Print" command from within a page layout program, such as XPress™, by Quark, Inc., the XPress™ print window displays options, linked to the options button within the print window, which are specific to the print or PPD file. The user is required to select these print options before sending the file to be printed from within the print selection window.

In some recent print driver systems, when a user sends a file to print from within an active application, the activated print driver application allows the user to select a destination printer from a list of available printers.

An administrative application is typically found at the location of a dedicated print server, which is connected to an output device, such as a copier or printer. The administrative user of a dedicated administrative application is commonly responsible for manual functions at the connected output device, such as loading input paper trays, managing selected print jobs, or modifying print queues for the dedicated print server. For example, as a particular job arrives, having a higher priority than another prior print job that is still in the spool or RIP queue, the administrator can optionally move the higher priority job to the front of the scheduled jobs.

In some basic prior art computer networks, such as Novell™ networks, a network application having a graphic user interface can be used to monitor a computer network. Within some Windows™ operating systems, a network user can selectively view other networked devices, and other information regarding the network. However, within a networked printing environment, information retrieval and control of printing function from either a client computer or an administrative computer is still cumbersome.

In a network that does not use two way communication of information between the connected computers and output devices (e.g. without SNMP protocol), when user goes activates the print driver, The user may select to print from one of a plurality of input trays. However, the print driver is not able to communicate the current tray status of each of the input trays (e.g. the print driver is unable to know, or to display to the user that the chosen input tray is currently filled with blue paper). In such a system, the user has to know, or find out, what paper is physically stocked in each tray.

However, in a network that uses two-way communication of information between the connected computers and output devices (e.g. with SNMP protocol), the printer can be configured to communicate current input tray information (e.g. when a user selects information for an input tray from within a print driver application, the information window may include detailed information regarding the current status of the input tray (e.g. a message stating "The paper in this tray is blue").

Within some print driver applications, a client user can also check toner levels at a pre-selected output device, before sending a print job (e.g. viewing toner output levels from within a print driver application is possible for some models of Epson printers).

In the prior art, a dedicated administrative workstation is typically connected to a single print server and peripheral device. The dedicated administrative workstation is used to display and control the operation of the single print server and peripheral device, and is typically used to process print jobs from multiple client computers. As well, the administrative user of a prior dedicated administrative print server application is typically required to set an update increment time for each queue (e.g. every 20 seconds). In such a system, the application would request an update queue information every 20 seconds, such as information regarding the spool queue, the RIP queue and the print queue at the dedicated print server. In such an administrative system, if a print job is printed quickly, in less time than the update setpoint, the print job may not even be displayed in a job list within the application.

It would be advantageous to provide a client print server link application, which allows a client user to view information regarding one or more output printing devices, controllably send one or more print jobs to any of the output printing devices, and receive information regarding each of the print jobs. It would also be advantageous to provide an administrative print server application, whereby an administrative user can view and control the status of a print system having one or more client computers and one or more print servers and printing output devices. The development of such a printing system would constitute a major technological advance.

SUMMARY OF THE INVENTION

A client print server link is provided, which uses two-way communication between a client computer and a printing system typically comprised of networked output devices and print servers. The client print server link provides detailed information regarding each print server and connected device within a printing system. The client print server link allows a client user at a client computer to access information and control each of their print jobs quickly and efficiently within a single application, without requiring the user to access a plurality of separate utilities. The client print server link groups and displays information that is relevant to print jobs sent by a single client user to one or more all connected print servers and output peripheral devices. An administrative print server link is also provided, which also uses two-way communication between a computer and a networked printing system. The administrative print server link provides detailed system information and control for multiple client users, print servers and output devices.

DETAILED DESCRIPTION OF PREFERRED EMBODIMENTS

Figure 1:
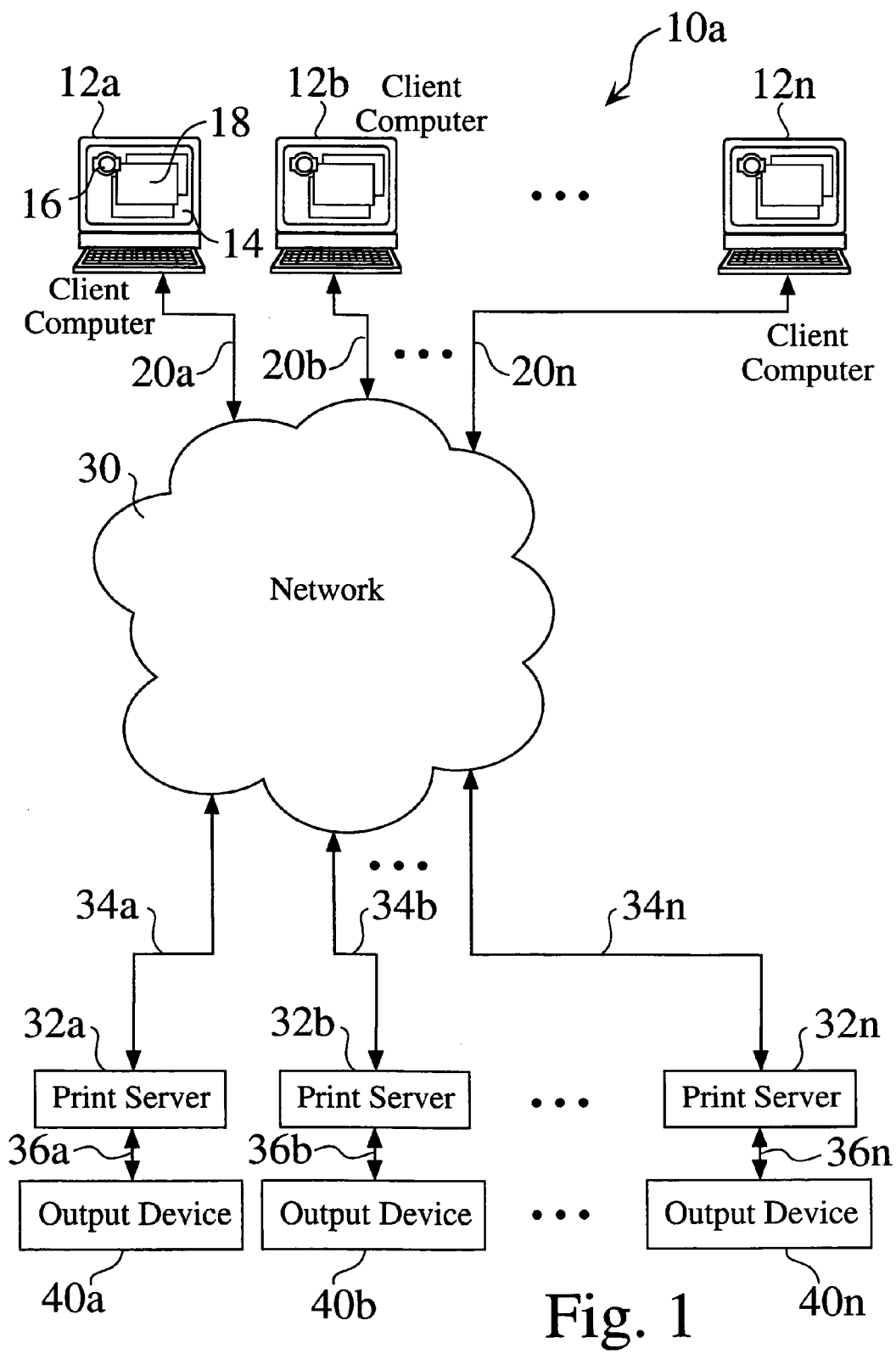
FIG. 1 is a block diagram of a networked printing system, comprising a plurality of client computers having client print sever links connected to a plurality of fiery print servers and output devices through a network.
Figure 2:
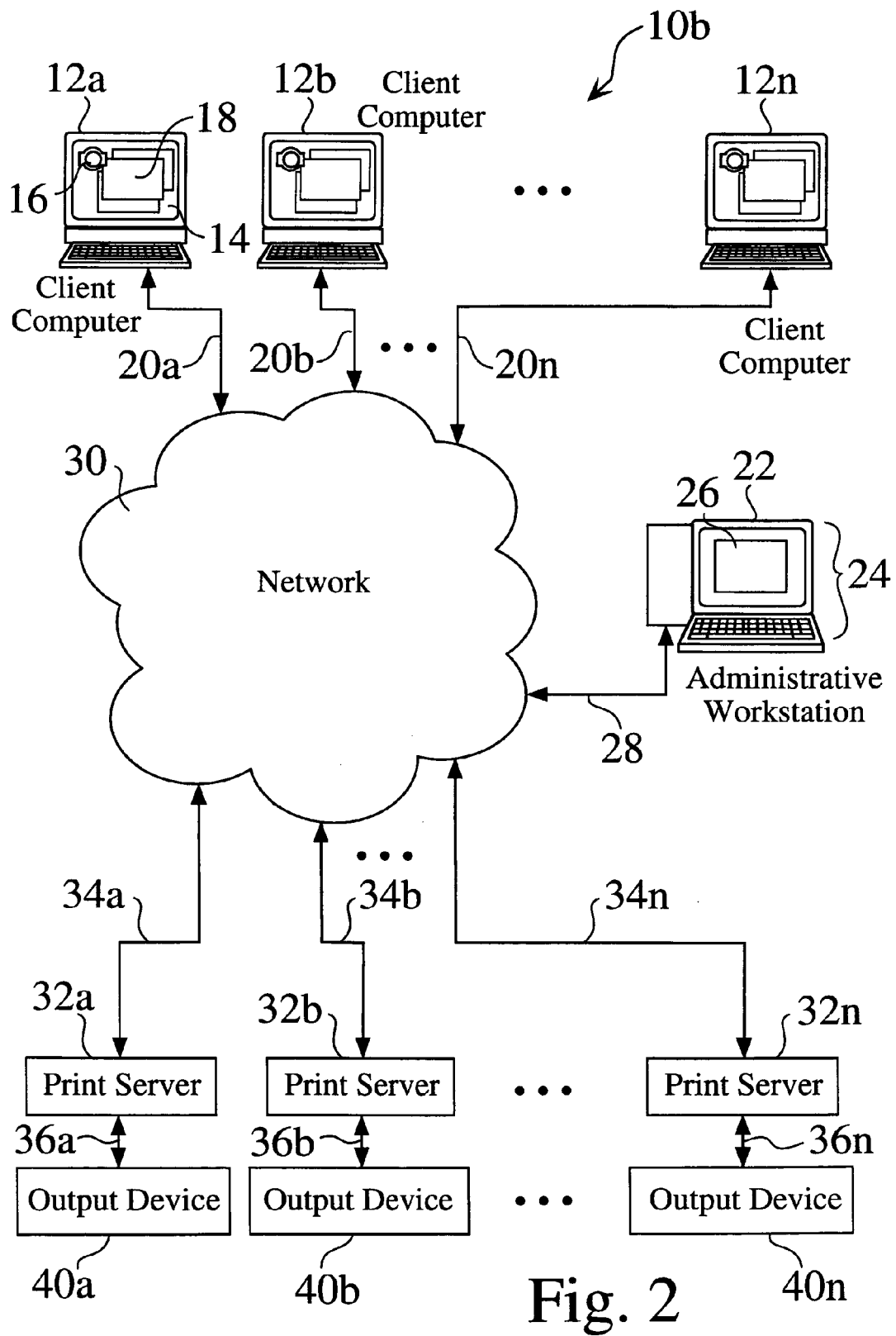
FIG. 2 is a block diagram of an alternate networked printing system, comprising a plurality of client computers having client print sever links, and a command workstation, connected to a plurality of fiery print servers and output devices through a network.
Figure 3:
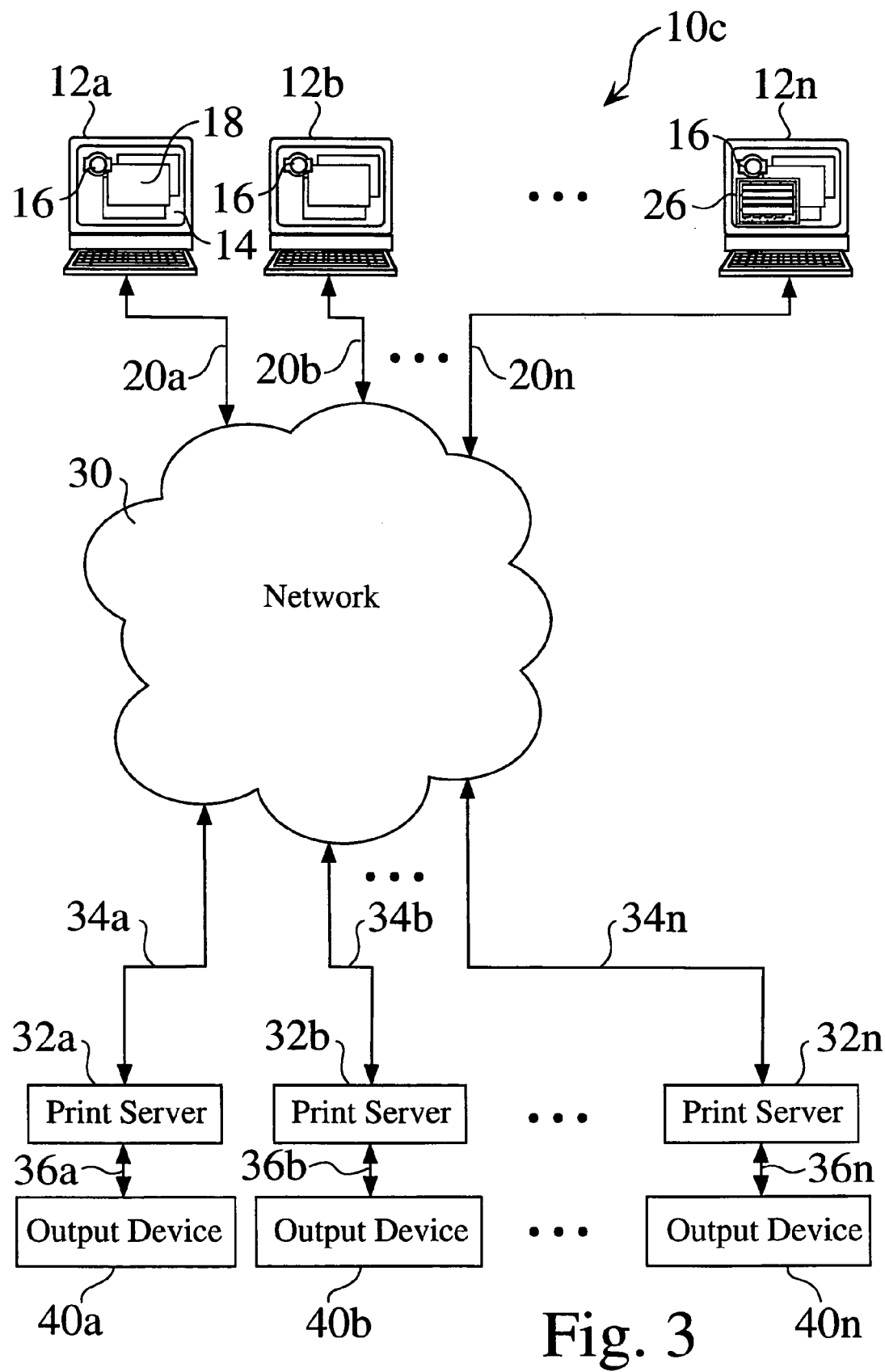
FIG. 3 is a block diagram of a printing system, comprising a plurality of client computers having client print sever links connected to a printing network, wherein one client computer also has an administrative print server link application.

FIG. 1 is a block diagram of a networked computer and output peripheral system 10a. A central network 30 is configured between one or more client computers 12a-12n and a plurality of print servers 32a-32n, such as fiery print servers 32, and connected output devices 40a-40n. In a preferred embodiment, an administrative workstation 24 is also connected to the network 30, as shown in the alternate networked computer and output peripheral system 10a of FIG. 2. Print jobs 18 are sent from client computers 12a-12n to print servers 32a-32n, and are then printed at connected output devices 40a-40n. FIG. 3 is a block diagram of an alternate printing system 10c, comprising a plurality of client computers having client print sever links 16 connected to a printing network 30, wherein one of client computers 12n also has an administrative print server link application 26.

A client print server link application 16, located at a client computer 12, allows a client user located at the client computer 12 to access one or more print servers 32a-32n and output devices 40a-40n, through a two-way communication connection. The client print server link 16 provides client users with pertinent information regarding the current status of each of their print jobs 18, regardless of which output device 40 each of the print jobs 18 is sent. This information may include displaying an estimation of the "time to print" for a print job 18, or providing a warning if or when a paper jam occurs at an output peripheral device 40, either in the process of printing one of their print jobs 18, or in the process of printing a print job 18 from a different, secondary client user, which would impede the printing of a print job 18 which was sent to the same output device 40 by the primary client user.

A client user can also use the client print server link 16 to pre-determine the current status of one or more print servers 32a-32n and connected output devices 40a-40n (i.e. before sending one or more print jobs 18). Such information can be utilized to insure the printability of a print job 18.

The client print server link 16 provides information and control, without compromising the normal task of printing a print job 18. The client user selectively views the current status of a print server 32 and it's output device 40, without requiring accessibility to network administrative functions, such as details of print jobs 18 from other client computers 12, queue status modification control, or other information or control which is best managed by an administrative user, such as by an administrative print server link 26. Therefore, the client print server link 16 can be used by all users, regardless of their level of access.

The client print server link 16 uses bi-directional connections 20,34 between one or more client computers 12a-12n and one or more print servers 32a-32n, preferably using an simple network management (SNMP) two-way communication protocol. The bi-directional communication connections 20,34 allow the client print server link 16 to provide information to the user, either on request; or on a "need-to-know" basis, regarding the status of their print jobs 18, or regarding the status of the system 10 which is pertinent to their print jobs 18.

While the client print server link 16 at a given client computer 12 only displays information that is relevant to a single client user, the two-way connections 20a-20n can either provide information from the network 30 that is unique to each client computer 12, or provide information regarding all client computers 12a-12n, all Fiery print servers 32, and all output peripheral devices 40a-40n. For two-way connections 20a-20n which provide information regarding all system devices 12,32,40 each client print server link 16 filters information that is relevant to each respective client computer 12.

Figure 4:
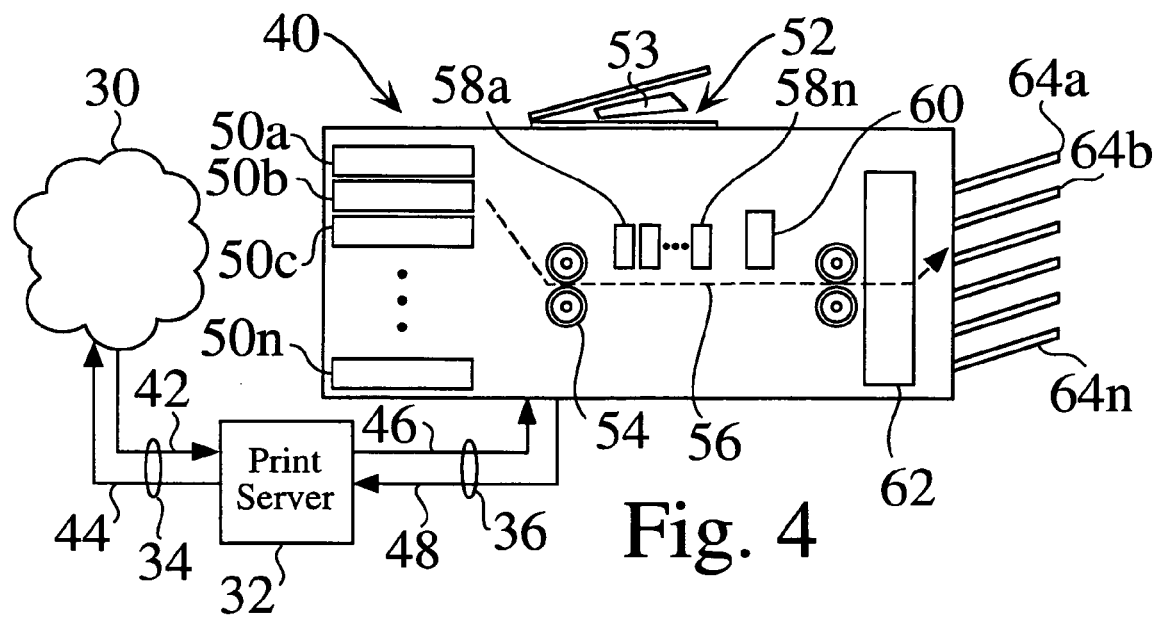
FIG. 4 is a detailed block diagram of an output peripheral device with a two-way connection to a network through a print server.

FIG. 4 is a detailed block diagram of an output device 40, which is connected to a print server 32 through a two-way connection 36, which includes print server-to-peripheral communication 46 and peripheral-to-print server communication 48. The print server 32 is connected to the network 30 through a two-way communication connection 34, which includes network-to-print server communication 42 and print server-to-network communication 44.

The output peripheral 40 typically includes one or more input trays 50-50n, a scanning mechanism 52 (e.g. for a networked copier/printer 40), and a feed mechanism 54 to controllably guide one or more substrates 51 (e.g. paper, transparent film) through a paper path 56, past one or more toner cartridges 58a-58n, fuser 60 (for some printing processes), an optional post processing mechanism 62 (e.g. stapling, collating, binding), and toward one or more output trays 64a-64n.

Output peripherals 40 can be printers or copiers, since both typically function as a printing device (i.e. print jobs 18 are typically performed by the application of toner or ink 58 to a substrate 51, such as paper or transparency film, in response to an input image). While a copier includes a scanner 52 to copy and produce a screen image of documents 53, it also functions as a printer. Current output peripherals 40 typically use many different printing technologies, such as inkjet, laser printing, thermal wax, or dye sublimation techniques. In some work environments, remote peripherals 40 are used for combined printing, copying and facsimile functions.

Figure 5:
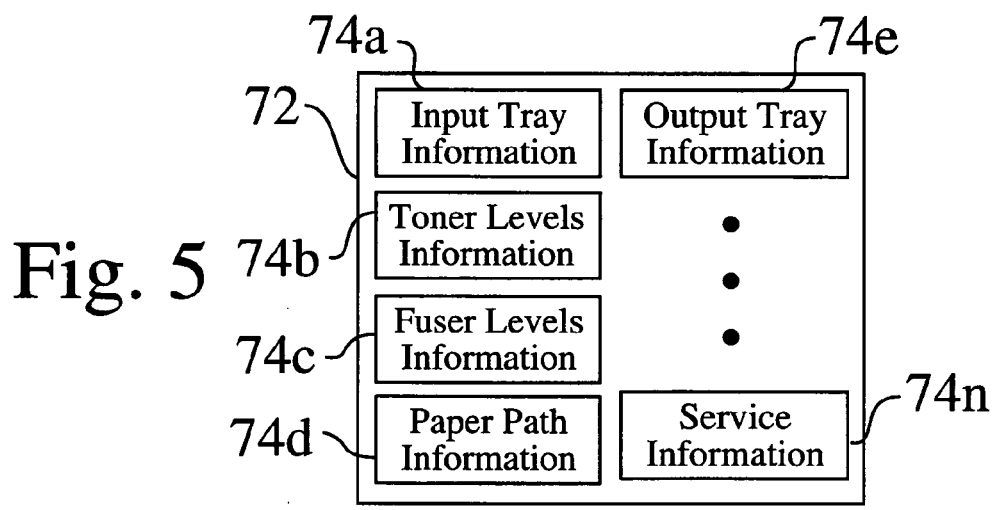
FIG. 5 shows a block diagram of an information feature set for an output peripheral device.

FIG. 5 shows a block diagram of an information feature set 72 for an output peripheral device 40. Output peripheral devices 40 typically have a feature set 72 which includes different features 74a-n, such as input tray information 74a (which may include the number and size of input trays 50a-50n), toner information 74b (e.g. process and spot toner colors 58a-58n), fuser information 74c regarding the current use of fuser 60, paper path information 74d regarding the paper path 56, output tray information 74e regarding output trays 64a-64n, and service information 74n.

The information feature set 72 regarding output device features and their current status may or may not be available for output to peripheral-to-print server communication 48. For example:

some printers 40 provide detailed output information 74b regarding toner levels 198 (FIGS. 19,21) of toner cartridges 58a-58n, such as "⅝ full" (currently, some ink jet printers 40 provide detailed toner level information 74b that is accurate to about 2 percent);

some printers 40 provide basic output information 74b regarding the toner level status 198 of toner cartridges 58a-58n, such as "empty" or "not empty"; and other printers 40 do not provide any output information 74b regarding the toner level status 198 of toner cartridges 58a-58n.

Each output peripheral 40 therefore typically has a mixed feature set 72 of information 74a-74n which is provided to the client print server link 16, or to an administrative print server link 26, through the peripheral-to-print server communication 48. A print server 32, such as a Fiery™ color print server 32, manufactured by Electronics for Imaging, Inc., of San Mateo, Calif., is typically located between each output peripheral device 40, and client computers 12a-12n, typically through a network 30.

In FIG. 4, the printer server 32 may be an EFI Fiery model XJ print server 32, manufactured by Electronics for Imaging, Inc., San Mateo, Ca. For a Fiery XJ print server 32, there is a limited amount of information regarding a connected output device 40 which can be collected over peripheral-to-print server communication 48, or can be sent to a client print server link over the print server-to-network communication 44. Therefore, while a Fiery XJ print server 32 may be connected to the network 30, there is a limited amount of information regarding a connected output device 40 which can be transferred to either a client print server link 16 or to an administrative print server link 26. While a client print server link 16 or an administrative print server link 26 may show basic information regarding print jobs 18 which are sent through a Fiery XJ, the client print server link 16 or administrative print server link 26 may not be able to display a large amount of information regarding a Fiery XJ print server 32, or be able to control all operations on a connected output device 40 that is connected to a Fiery XJ print server 32.

Therefore, if a print server 32 which is connected to network 30 doesn't provide complete two-way communication, such as SNMP, the client print server link 16 and the command workstation 24, either won't see the print server 32 or an output device connected to the print server 32, or may see the print server 32 and the output device 40, but will not be able to get detailed information.

For many connected print servers 32, however, such as Fiery ZX print servers 32, a large amount of information can be received and processed through the system, thus allowing client print server links 16 or administrative print server links 26 to display a large amount of information regarding a Fiery ZX print server 32, or be able to control all operations on a connected output device 40 that is connected to a Fiery ZX print server 32

Figure 6:
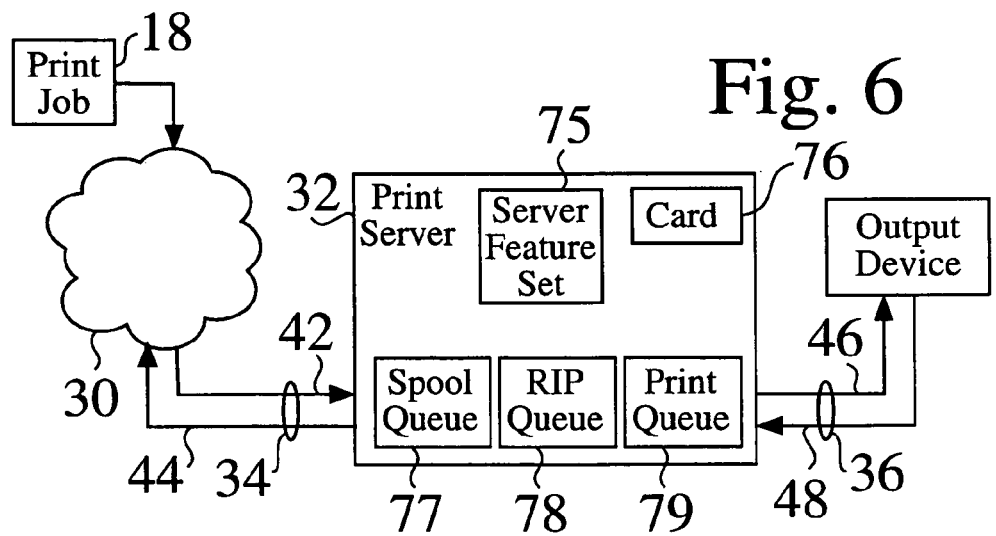
FIG. 6 is a detailed block diagram of a networked print server.

FIG. 6 shows a print server 32 connected to an output peripheral device 40. The print server 32 typically includes print job format information regarding the connected output peripheral device 40, such as within a removable card 76. The device format information allows the print server 32 to properly translate or format print jobs 18 for the output peripheral device 40.

Client users located anywhere on the network 30 can send documents 18 from their desktop computers 12, towards a specified destination print server 32 and output device 40. Each print server 32 receives print jobs 18 from the network 30, from one or more of the client computers 12a-12n. Some print jobs 18 may be sent directly through the print server 32, without modification to the print job 18. For example, an expert client user can optionally send a print job 18 in a format which the destination output peripheral printer 40 can understand (such as in a Postscript™ file format), which the print server 32 doesn't need to modify for a particular destination output peripheral 40 that can process print jobs 18 in a Postscript™ file format. In this example, the print server 32 connected to the destination output device 40 detects that the particular print job 18 is already in a format which the destination output peripheral 40 understands, and is able to forward the print job 18 to the output peripheral printer 40.

For many print job files 18, however, the print server 32 modifies or translates the print job 18, so that the connected printer 40 can understand and print the modified print job 18. The print server 32 modifies print job files 18, as necessary, to be in printable form. For example, many output devices 40 print data in a compressed raster data format, such as a tagged information file format (TIFF). For a print job 18 arriving at a print server 32 in a format other than TIFF, such as a Postscript™ format, the print server translates the file 18 to a TIFF format, by a process known as Raster Image Processing (RIPping). The print server 32 can then either send the formatted print job 18 directly to the destination output device 40, for printing, or can store the formatted print job 18 for later use.

The required output format from the print server 32 is therefore dependent on print format of the destination printer 40. Print servers 32 are typically matched which the output device 40 to which they are connected (e.g. print servers 32 commonly have an installed format card 76, specific to the connected output peripheral 40), which allows the print server 32 to match the output format of print jobs 18 to the required input format of the connected output peripheral 40.

System Operation. The client print server link 16 provides client users at client computers 12a-12n with relevant information for print servers 32a-32n and output peripherals 40a-n which are connected to the network 30. Client users can view the status of all the output peripherals 40a-40n, such as though a list format (FIG. 22), and can decide which of the output peripherals 40a-n to send a print job 18.

The client print server link 16 continually receives information from the print servers 32a-32n across the network 30, and displays information that is relevant to the client user. For example, the client print server link 16 at a client computer 12a may not display information regarding the status of a connected print server 32b and output peripheral 40b, until the client user at client computer 12a checks the status of print server 32b and output peripheral 40b through the client print server link 16. If the client user at client computer 12a checks the status of print server 32b and output peripheral 40b through the client print server link 16, the client print server link 16 then receives and displays the information regarding print server 32b or output peripheral 40b. The client print server link 16 therefore displays information on both an "as-needed" and an "as-requested" basis.

As-Needed Information. As-needed information typically refers to relevant information regarding the status of print jobs 18 which have been sent by a client user (based on information from the destination output devices 40a-40n and their connected print servers 32a-32n).

For some instances, for particular print jobs 18, "as needed" may be to bring in information on an alert basis. Alerts are prioritized, such that the highest alert condition is typically one which stops a print job 18 from printing, such as a "paper jam" or "paper out" condition at a destination output peripheral 40. In a similar error condition, a print job 18 from secondary user at the same destination output device 40 may have jammed, which also keeps the primary user's job 18 from printing. If the secondary client user is away (i.e. the secondary user is not available to attend to the paper jam), it may be in the interest of the primary client user to fix the paper jam, so that the print job 18 from the secondary user can finish printing, allowing the primary user's print job 18 to then start printing. The client print server link 16 can let the user know of such conditions.

In a preferred embodiment of the client print server link 16, the priorities of "as needed" alerts are selectively set at the client computer 12; such as paper jams from any user's jobs. If the user happens to be monitoring a print server 32a and connected output device 40a, and the output device 40b connected to print server 32b had a jam, the client print server link 16 is capable of alerting the user to the error condition at print server 32b and output device 40b, regardless of the print job 18 which was jammed.

As-Requested Information. As-requested information may include information regarding devices which are currently being used by the client user for one or more print jobs 18, or may be information regarding other output devices (e.g. for a client user who wishes to check the status of an output peripheral before sending a print job 18).

In another preferred embodiment, the client print server link 16 automatically notifies personnel, such as client users or service personnel, of errors or service conditions. Service notification can be through the transmission of an e-mail, or by automatic paging the intended personnel. For example, at a large company where a client user or other person is in charge of keeping paper 51 loaded in one or more output device 40, an automated e-mail or page message can be selectively sent.

The client print server link 16 provides a client user with detailed information regarding each print server 32 and connected device 40 within a printing system environment 10. The client print server link 16 allows a client user at a client computer 12 to access information and control print jobs quickly and efficiently, without requiring the user to access a plurality of separate utilities. The client print server link 16 takes advantage of information accessed from two-way network communication protocols (e.g. SNMP communication), and delivers a wealth of information and feedback to the client print server link 16. The client print server link 16 easily accommodates the necessities of all bi-directional equipped printing devices 40. The client print server link 16 greatly improves the human user-printer relationship, and is an invaluable interface for network print server and printer users.

Information displayed by the client print server link 16 can originate from many print servers 32 or output devices 40 within the system 10. Some information is typically provided directly by the print servers 32, through a print server feature set 75 (FIG. 6), such as print server model 148 (FIG. 13), print server information 150, 152, 154 (FIG. 13), and sensed connected output peripherals 40. Such information is available to the client print server link 16, no matter what kind of output device 40 to which the print job 18 is sent.

As discussed above, the connected output device 40 is responsible for providing device information 74a-74n (FIG. 5), such as levels of toner 58a-58n, level of fuser 60, levels of input paper trays 50a-50c, and levels of output paper trays 64a-64n. If the output device 40 does not provide a particular feature 74, the client print server link 16 and the administrative print server link 24 do not support that feature for the connected output device 40.

A first client print server link 16, on a first client computer 12a, displays information that is relevant to print jobs 18 which are sent from the first client computer 12a, regardless of where they went (e.g. a first print job 18a at print server 32b and output device 40b, and a second print job 18b at print server 32n and output device 40n. Therefore, the client print server link 16 groups and displays information that is relevant to print jobs 18 sent by a single client user to one or more all connected print servers 32a-32n and output peripheral devices 40a-40n.

For a simple client user, the client print server link 16 provides a default print job screen during printing. When the print job 18 is finished printing, the client print server link 16 displays a print summary screen, showing that the print job 18 was successfully printed. Optionally, a more sophisticated client user can monitor each page of a print job 18 during the printing process, so the user knows when to get up and get the printed job from the output tray 64 of the destination output device 40.

In a preferred embodiment of the client print server link 16, stored information, such as print logs, and job logs, can either be stored at the client computer 12, at the print server 32, or within an administrative print server link 26.

Client Print Server Link Interface. The preferred graphic user interfaces 80, 212, 250 of the client print server link 16 allow client user to easily explore features and display information quickly. Within a small portion of the client computer monitor screen 14, a large amount of information is accessed with minimal mouse or keyboard movements. Similar tools and information display screens are typically grouped together.

In one embodiment, selected functions are clearly indicated by a green indicator. Context sensitive help 83 (FIGS. 7-25) assists the user in learning one feature from the next.

When new features are added, such as adding a new output device 40 or print server 32 to the printing system 10, or the addition of a new output device 40 or print server 32 having a new feature set 72, such as more accurate toner levels 196, 198, or even a new printing technology (e.g. inks, toners, etching, thermal wax, dye sublimation, offset screening, post processing), the new features are readily accessed from the interface of the client print server link 16.

Tools and Functions. The displayed information and controls within the client print server link 16 varies, depending on the printer server feature set 75 (FIG. 6) and the output peripheral device feature set 72 (FIG. 5). As discussed above, feature sets 72,75 displayed within the client print server link 16 can change dynamically, while moving from one device 32, 40 to another. For example, one output printer 40, such as a CLC1000 color printer, manufactured by Canon Inc., of Japan typically supports multiple output trays 64a-64n, while an imbedded Fiery™ Color laser printer 32,40 may have only one output tray 64. Regardless, the output paper tray status 74c is equally important in both output devices 40.

In another example, not all output peripheral devices 40 supply the user with fuser information 74c (FIG. 4), even if the connected output peripheral device 40 uses fuser 60 (FIG. 3). The client print server link 16 accommodates for different output device features (e.g. input trays 50, scanner 52, toners 58, fuser 60, output trays 64) and communicated feature sets 72 (which includes feature information 74a-74n) either by disabling unavailable functions, or by indicating functions which are not communicated to the client print server link 16. The interface of the client print server link 16 is easily modified to provide displayed information and controls for specific print servers 32 and output peripheral devices 40.

Figure 7:
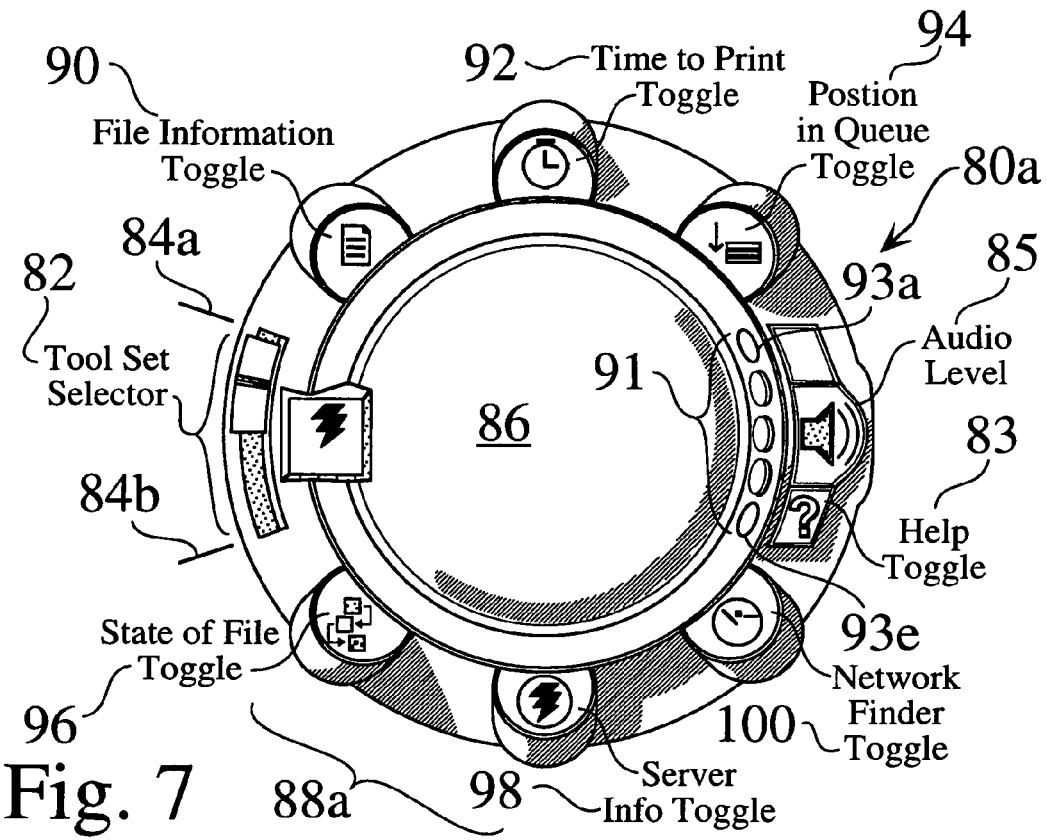
FIG. 7 is a print server and print job interface for a peripheral icon embodiment of a client print server link.
Figure 8:
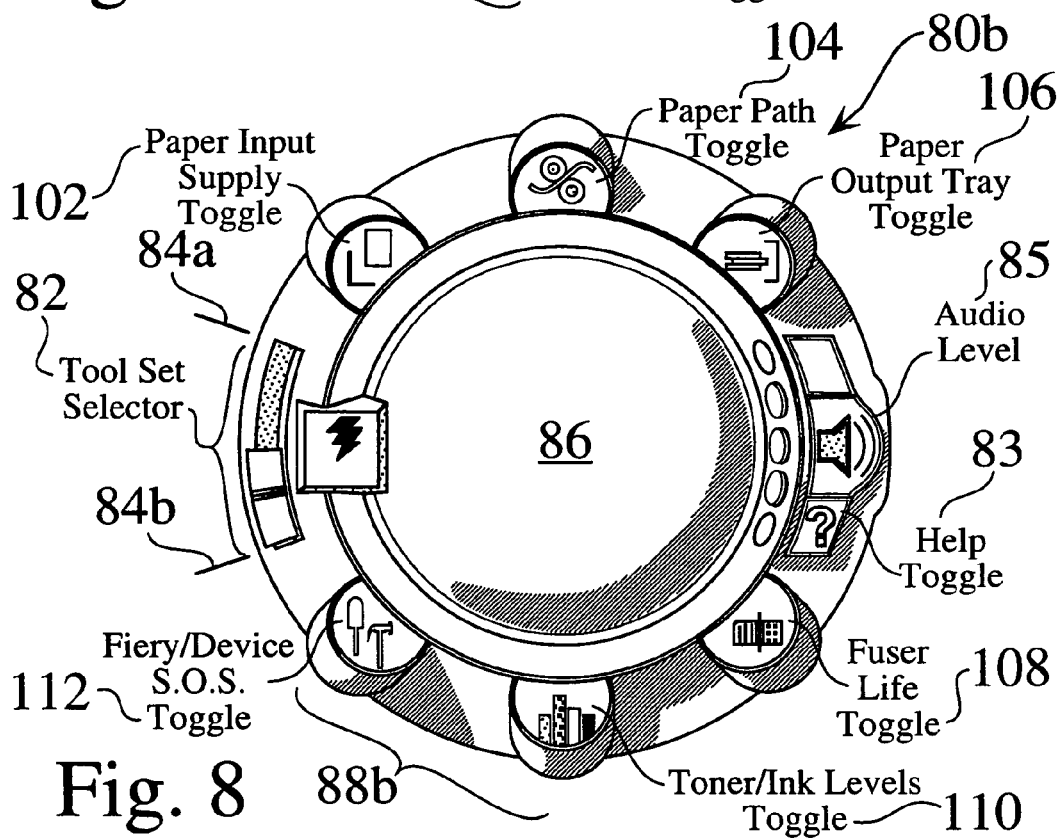
FIG. 8 is an output peripheral device interface for a peripheral icon embodiment of a client print server link.

Peripheral Icon Client Print Server Link Interface. FIG. 7 is a print server and print job interface 80a for a peripheral icon embodiment of a client print server link 16. FIG. 8 is an output peripheral device interface 80b for a peripheral icon embodiment of a client print server link 16. The central display 86 of the peripheral icon embodiment of a client print server link 16 displays information to the client user. A toolset selector 82 is movable between a first position 84a (FIG. 7) and a second position 84b (FIG. 8).

When the toolset selector 82 is located in the first position 84a, the print server and print job interface 80a is displayed, and features a print server and print job toolset 88a, which typically includes a file information toggle 90, a time to print toggle 92, a position in queue toggle 94, a state of file toggle 96, a print server information toggle 98, and a print server finder toggle 100.

The client print server link 16 preferably includes context-sensitive help, and is activated by a help toggle 83. Context-sensitive help aids the user in learning the various tools contained within the client print server link 16. In a preferred embodiment, context-sensitive help functions appear when the client computer mouse is held over feature toggle icons (e.g. over "position in queue" toggle 94) or over a feature for a set length of time (e.g. over "state of file" toggle 96 for 3 seconds). Help is alternately turned off or on by depressing the help toggle button 83.

In a preferred embodiment, various audio alerts and sounds inform the user of a printing error, or provide a signal when a print job 18 is completed. The audio control button 85 preferably has three switchable states; loud, soft, and mute.

Figure 9:
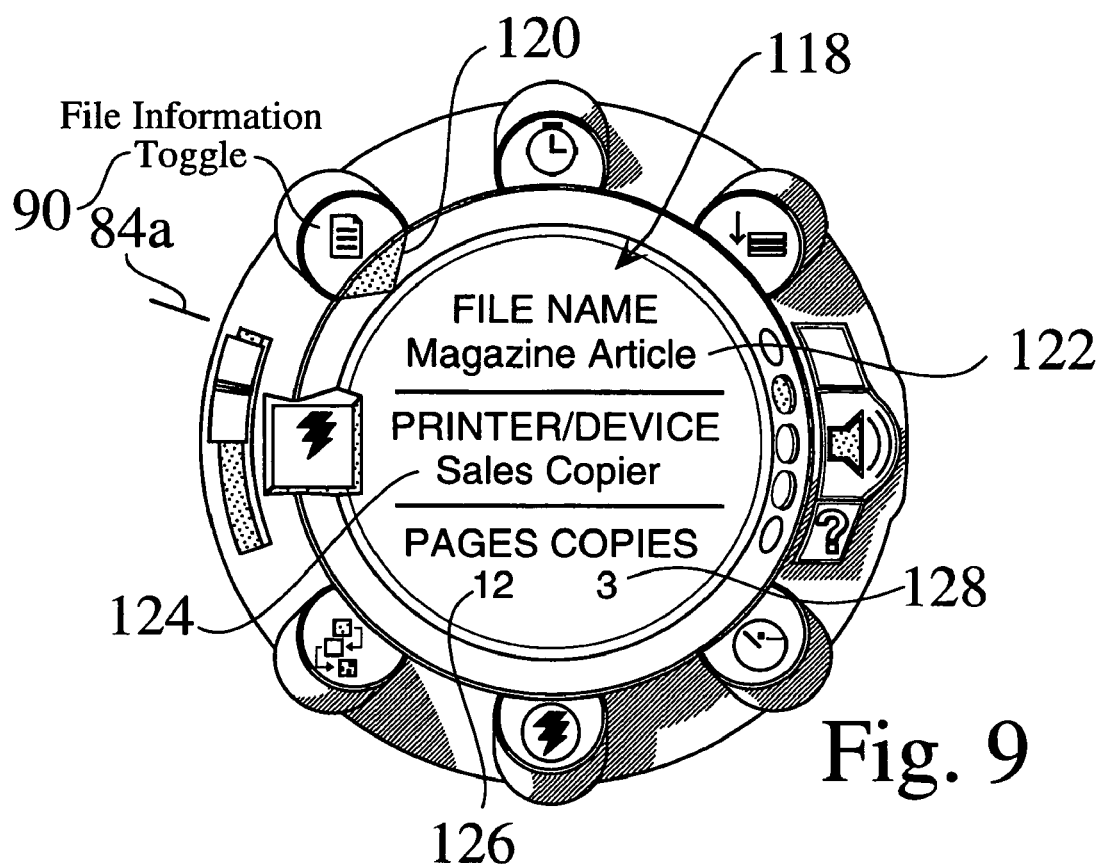
FIG. 9 is a file information screen for a peripheral icon embodiment of a client print server link.

File Information Screen. Activation of the file information toggle 90 (FIG. 7) switches the active screen 86 to the file information screen 118, as shown in FIG. 9. In the peripheral icon interface embodiment 80a,80b of the client print server link 16, the active toggle (e.g. the file information 90 in FIG. 9) is highlighted by an indication pointer 120. The file information screen 118 displays information regarding the currently selected print job 18, which includes file name 122 (e.g. "Magazine Article"), printer/device name 124 (e.g. "Sales Copier"), print job pages 126 (e.g. twelve pages for "Magazine Article"), and the specified number of copies 128 (e.g. three copies of "Magazine Article").

Figure 10:
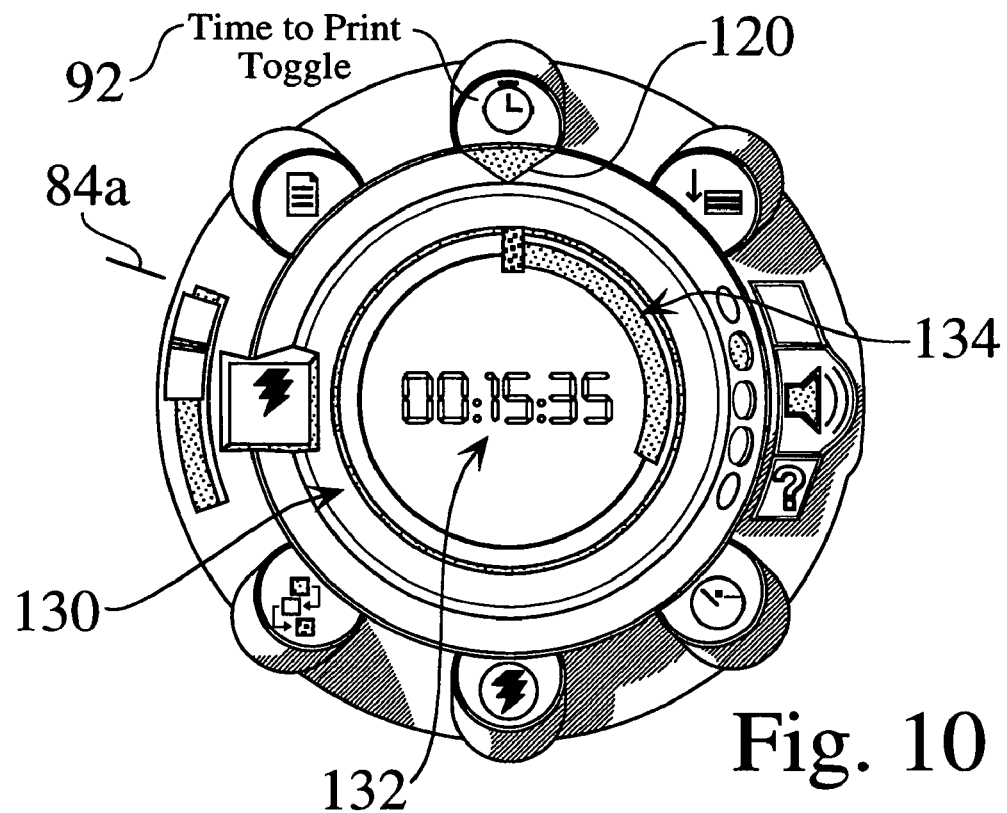
FIG. 10 is a time to print screen for a peripheral icon embodiment of a client print server link.

Time to Print Screen. Activation of the time to print icon 92 switches the active screen 86 to the time to print screen 130, as shown in FIG. 10. The time to print screen 130 displays an estimation of the total time 132 the print server 32 and associated output peripheral device 40 will take to print the currently selected print job 18. This estimation 132 changes, depending on the current print server queue status. In addition to a numerical display 132, a graphic representation 134 of the time to print is displayed for quick viewing, and for viewing from a distance.

Figure 11:
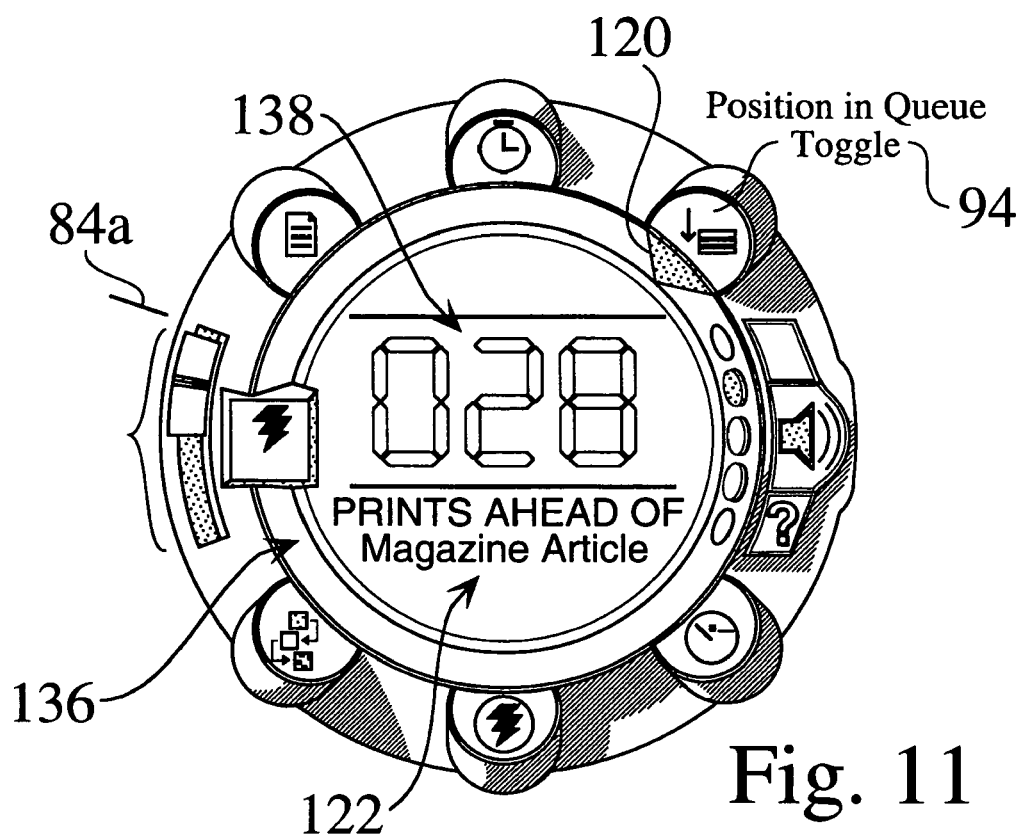
FIG. 11 is a position in queue screen on a print server and print job interface for a peripheral icon embodiment of a client print server link.

Position in Queue Screen. Activation of the position in queue icon 94 switches the active screen 86 to the position in queue screen 136, as shown in FIG. 11. The position in queue screen 136 displays the exact position of the selected print job 18 in a queue (e.g. print queue 79 (FIG. 6)). The number displayed 138 shows the number of prints (e.g. twenty eight) ahead of the currently selected print job 18 having file name 122 (e.g. ahead of "Magazine Article"). Once the current print job 18 is printing, the displayed number 138 changes to reflect the number of outstanding prints for the current print job 18. The position in queue screen 136 gives the client user an alternative to the time to print screen 130 (FIG. 10).

Figure 12:
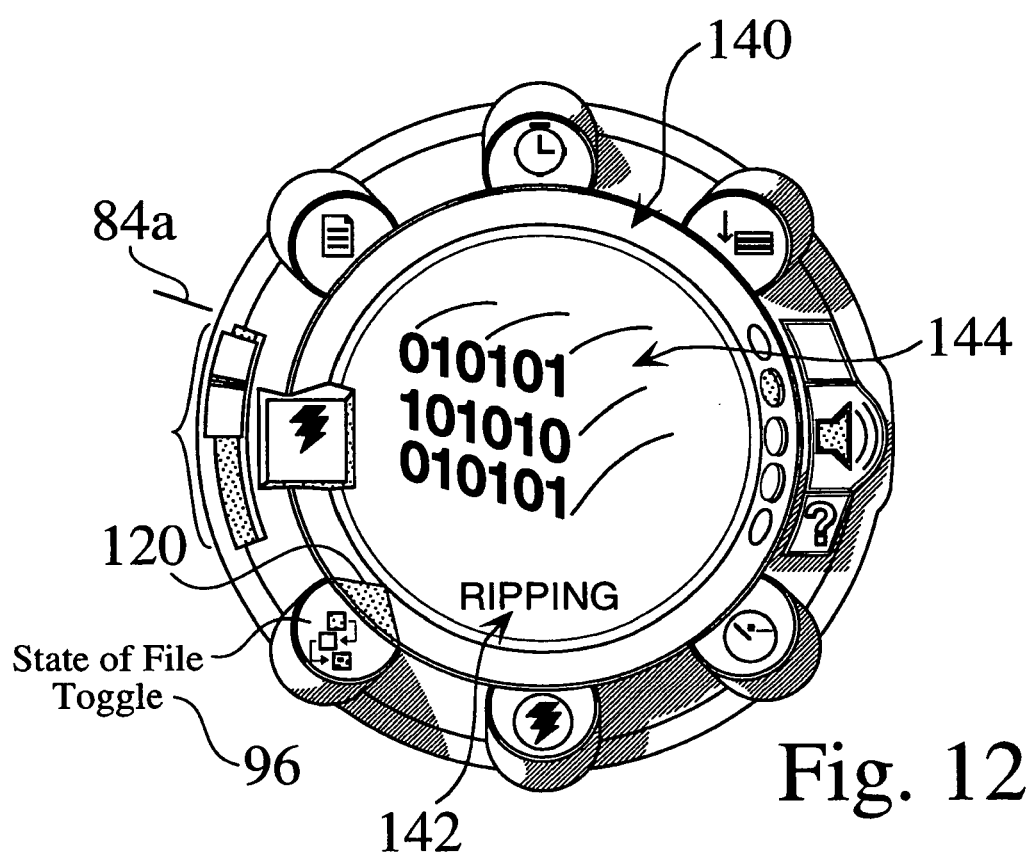
FIG. 12 is a state of file screen on a print server and print job interface for a peripheral icon embodiment of a client print server link.

State of File Screen. Activation of the state of file icon 96 switches the active screen to the state of file screen 140, as shown in FIG. 12. A state of file message 142 informs the client user of the current queue status of the selected print job 18. In a preferred embodiment, a state of file graphic 144, such as a state of file animation 144, is also used. The possible states of the state of file message 142 and the state of file graphic 144 are: "SPOOLING", "WAITING TO RIP"' "RIPPING", "WAITING TO PRINT", and "PRINTING". The state of file message 142 and the state of file graphic 144 are useful for client users who send their print jobs to a single print server 32, or for client users who are tracking the progress of large print job files 18.

Figure 13:
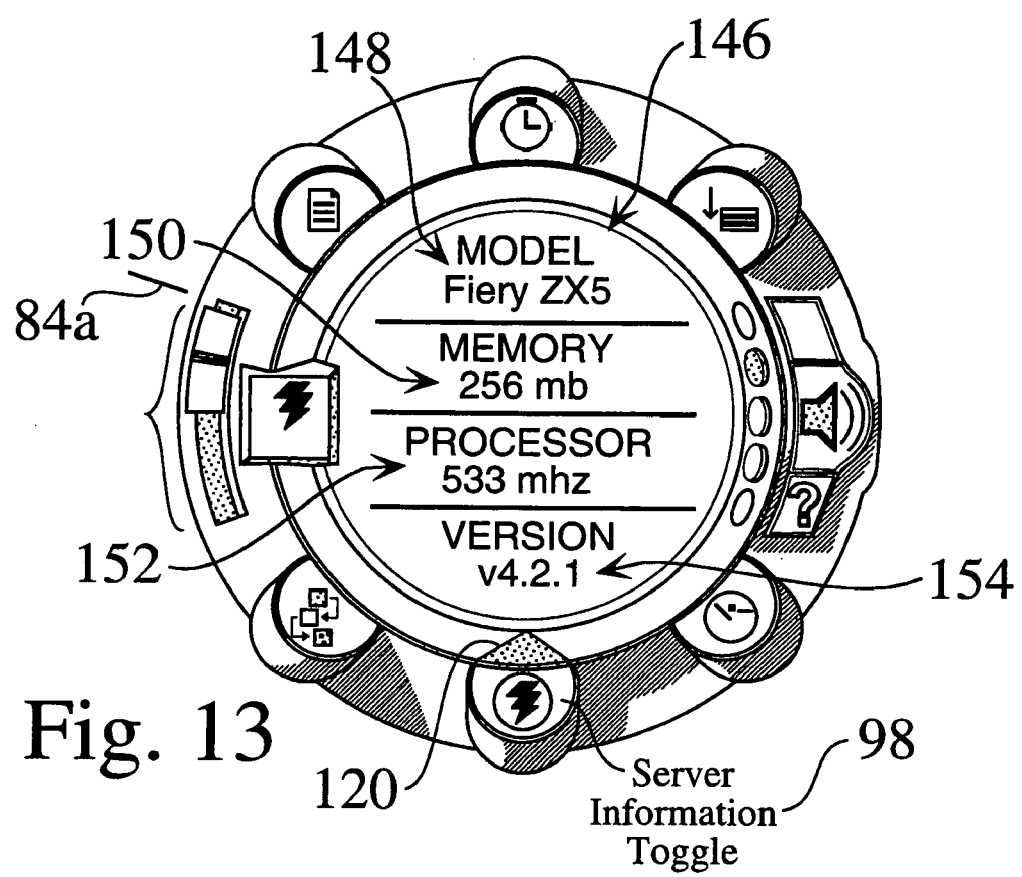
FIG. 13 is a print server screen on a print server and print job interface for a peripheral icon embodiment of a client print server link.
Figure 14:
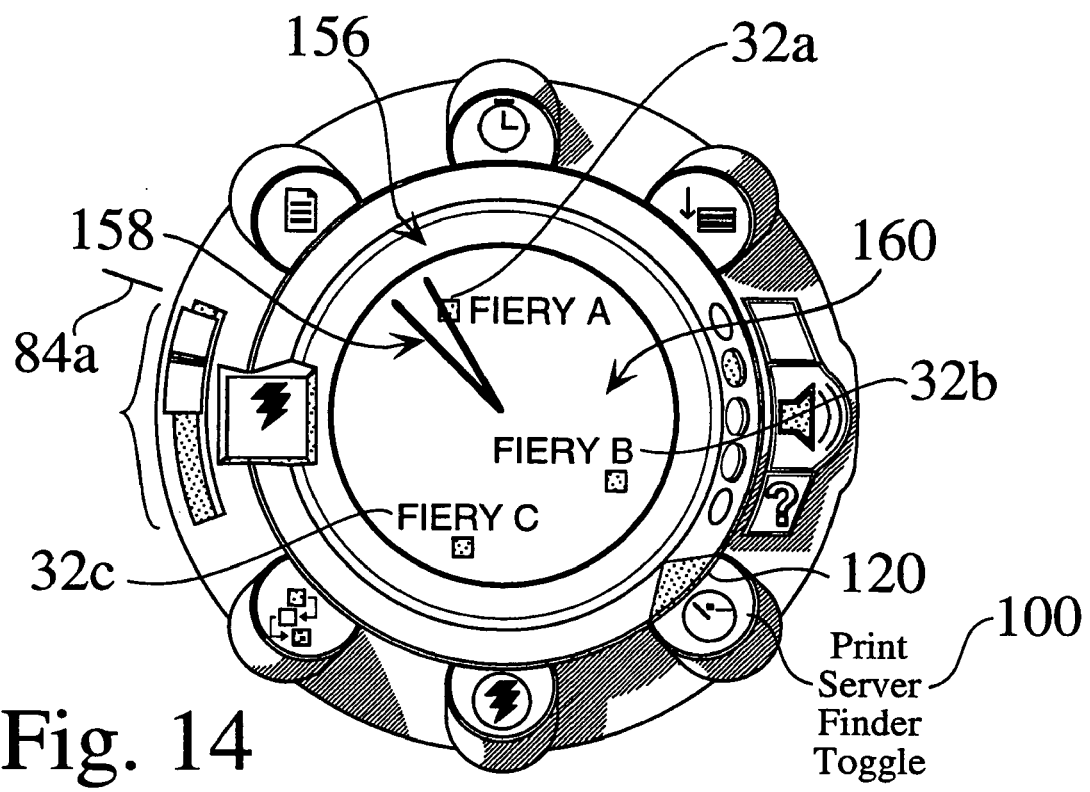
FIG. 14 is a network overview screen on a print server and print job interface for a peripheral icon embodiment of a client print server link.

Print Server Information Screen. Activation of the print server information icon 98 switches the active screen to the print server information screen 146, as shown in FIG. 13. The print server information screen 146 displays the print server model 148, the available memory at the print server 150, the print server microprocessor type 152, and the current print server software version 154.

Print Server Finder Screen. Activation of the print server finder icon 100 switches the active screen 86 to the print server finder screen 156, as shown in FIG. 13. The print server finder 156 serves allows a client user to controllably select destination print servers 32 and output devices 40. The print server finder screen 156 also allows the user to pre-check the status of one or more print servers 32a-32n and their connected devices 40, by using a print server selector 158, prior to sending a print job 18. The print server finder screen 156 and print server selector 158 are important tools for many client users. For example, consider a client user who is preparing to print a large print job 18 (e.g. a 200 page booklet) with a solid yellow background, on A4 paper, before leaving work. From the client computer 12, the client user can controllably move the print server selector 158 to a print server 32 and output device 40, and determine whether a selected destination output device 40 supports A4 paper, contains enough A4 paper, and can estimate if enough yellow toner 52 is available to complete the job 18 effectively.

When the toolset selector 82 (FIG. 8) is located in the second position 84b in the peripheral icon embodiment of a client print server link 16, the output peripheral device interface 80b is displayed, and features an output device toolset 88b, which typically includes a paper input supply toggle 102, paper path toggle 104, a paper output tray toggle 106, a fuser life toggle 108, a toner/ink levels toggle 110, and a print server and output device service (S.O.S.) toggle 112.

Figure 15:
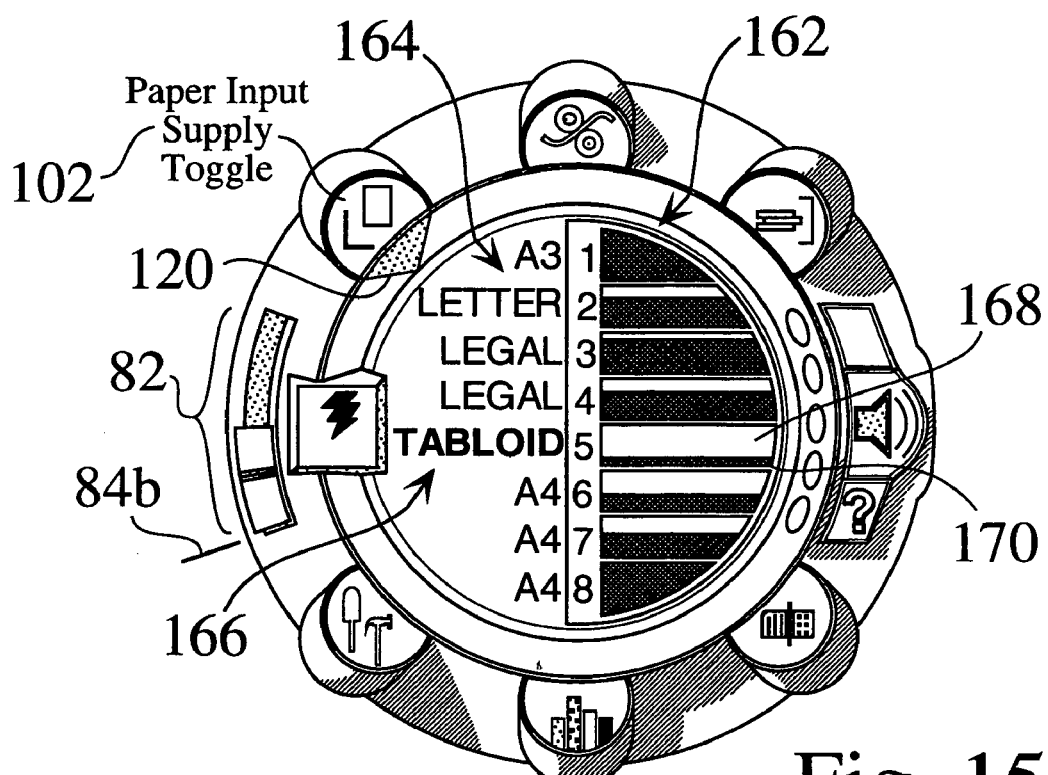
FIG. 15 is a paper input supply screen of an output peripheral device interface for a peripheral icon embodiment of a client print server link.

Paper Input Supply Screen. Activation of the paper input supply icon 102 switches the active screen 86 to the paper input supply screen 162, as shown in FIG. 15. The paper input supply screen 162 typically displays 164 the installed paper trays at each paper tray location 50a-50n (FIG. 4) (e.g. a tabloid size paper tray 50 is currently installed in tray location "5" in FIG. 15). In FIG. 15, the chosen paper input tray is indicated 166 by a bold face "TABLOID" at tray number 5. For each of the input trays 50, a level graphic 168 is preferably included, each having a level indicator 170 to estimate the supply of paper 51 remaining in each installed tray 50a-50n.

Figure 16:
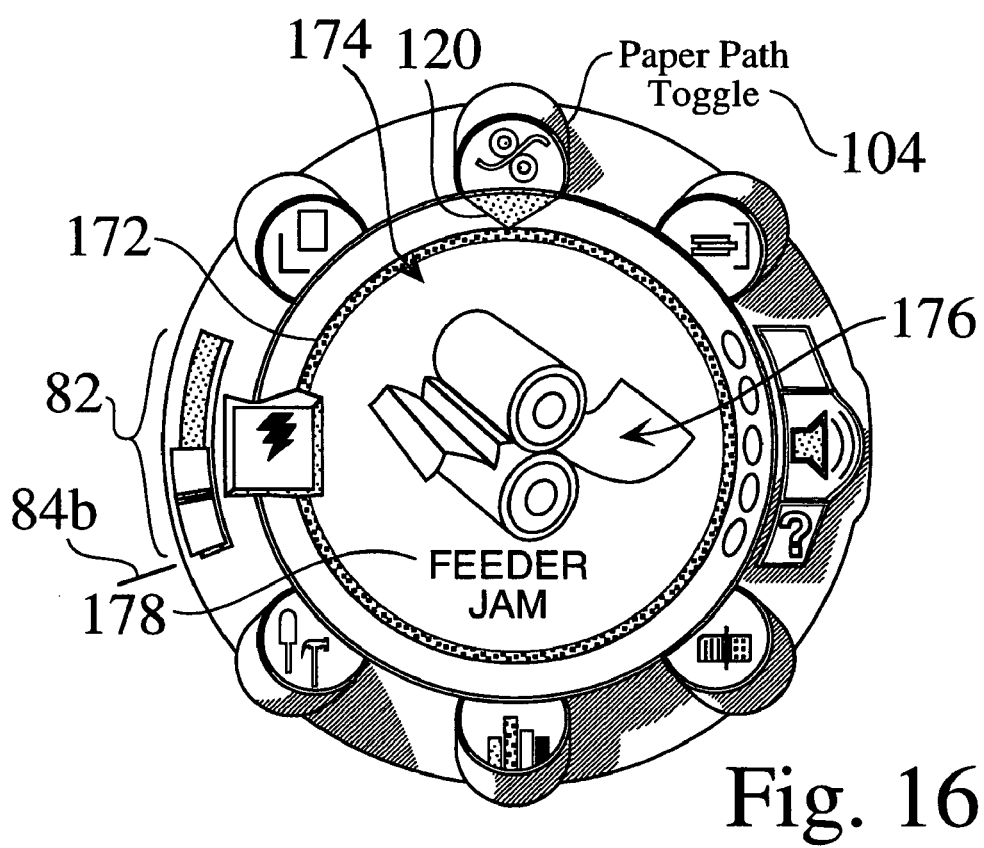
FIG. 16 is a paper path information screen of an output peripheral device interface for a peripheral icon embodiment of a client print server link.

Paper Path Screen. Activation of the paper path icon 104 switches the active screen to the paper path screen 174, as shown in FIG. 16. The paper path message 178 informs the user of the current status of the paper path 56 (FIG. 4) at a destination output device 40, including error conditions. If an error condition exists, such as a paper jam, an error indicator 172 is highlighted. In a preferred embodiment, a paper path graphic 176, such as a paper path animation 176, is also used. Typical paper path messages 178 and the paper path graphics 176 for most output devices 40 are: "PAPER PATH CLEAR", "INPUT PATH JAM", "INTERNAL PATH JAM", "OUTPUT PATH JAM", and "JAM CLEARED". The paper path message 178 and the paper path graphic 176 are useful for client users who send their print jobs 18 to a single print server 32, or for client users who are tracking the progress of large print job files 18. When a paper jam has been resolved, the client user is notified, and printing of a print job 18 can proceed.

Figure 17:
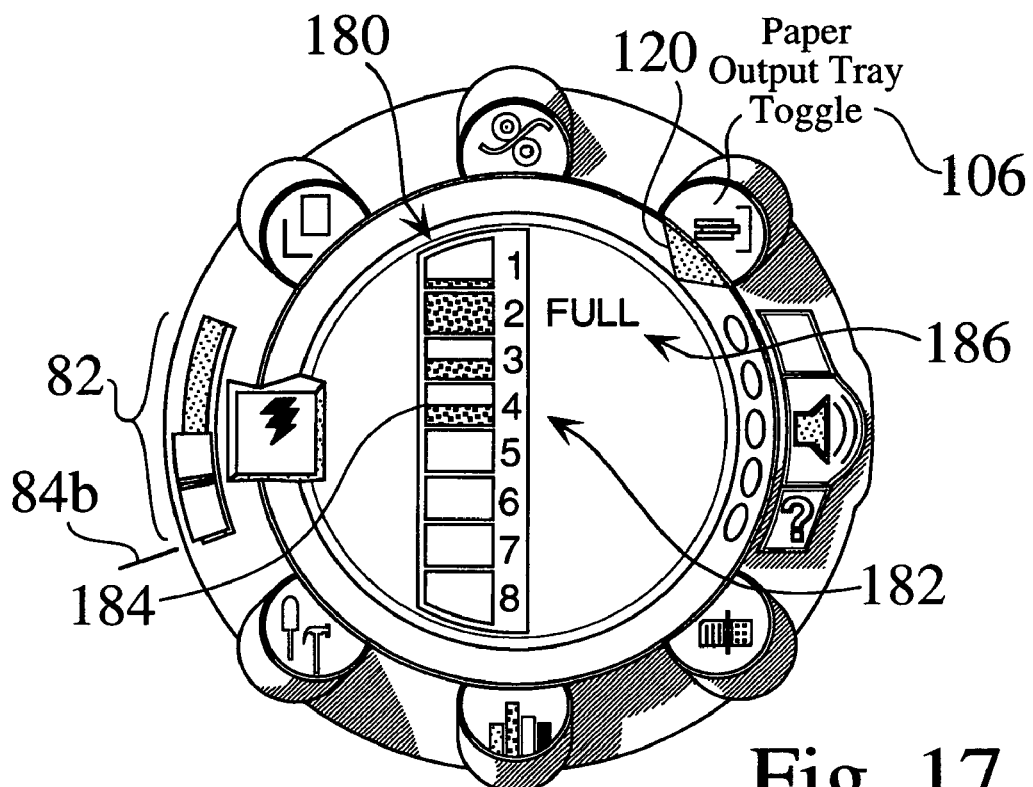
FIG. 17 is a paper output tray screen of an output peripheral device interface for a peripheral icon embodiment of a client print server link.

Paper Output Trays Screen. Activation of the paper output trays icon 106 switches the active screen to the paper output trays screen 180, as shown in FIG. 17. The paper output trays screen 180 displays a list 182 of available output trays 64a-64n (FIG. 4), and displays an estimate 184 of the amount of prints that have accumulated in each output tray 64a-64n. In a preferred embodiment, output tray messages 186 inform the client user of full output trays 64a-64n.

Figure 18:
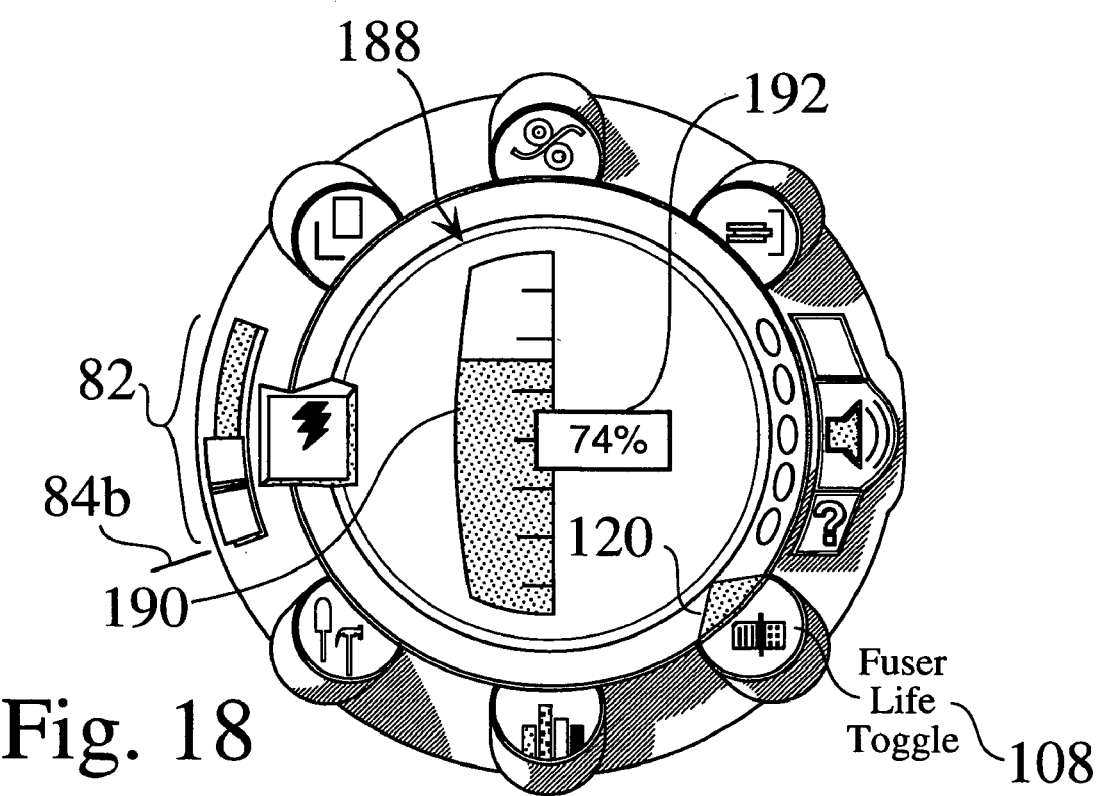
FIG. 18 is a fuser life information screen of an output peripheral device interface for a peripheral icon embodiment of a client print server link.

Fuser Life Screen. Activation of the fuser life icon 108 switches the active screen to the fuser life screen 188, as shown in FIG. 18. The fuser life screen 188 displays an estimate of the fuser life 60 (FIG. 4), based on the number of clicks printed since the fuser 60 was last replaced. A fuser life indicator 190 preferably provides a graphic estimation, such as a bar chart, while a numerical fuser life indication 192 displays an estimated percentage of fuser 60 remaining.

Figure 19:
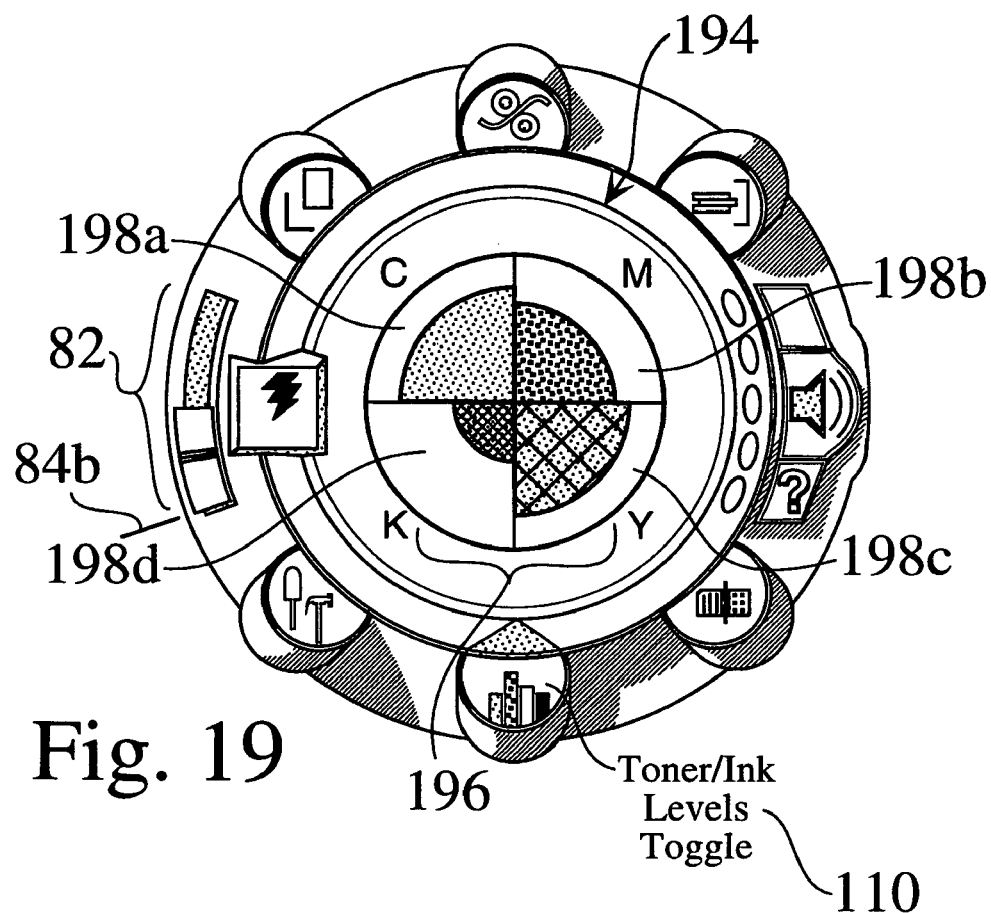
FIG. 19 is a toner levels information screen of an output peripheral device interface for a peripheral icon embodiment of a client print server link.

Toner Levels Screen. Activation of the toner levels icon 110 switches the active screen to the toner levels screen 194, as shown in FIG. 19. The toner levels screen 194 includes a toner levels display 196, which shows an estimate of remaining toner 58*a*-58*n* (FIG. 4) for all available colors, using level indicators 198*a*-198*n*.

For an output device 40 which includes four toner cartridges 58 for process color printing, comprising cyan (C) toner 58*a*, magenta (M) toner 58*b*, yellow (Y) toner 58*c*, and black (K) 58*d* toner cartridges, the toner levels indicator 196 includes a cyan toner level indicator 198*a*, a magenta toner indicator 198*b*, a yellow toner indicator 198*c*, and a black toner level 198*d*. The toner levels screen 196 is typically split to show all available toner colors 58*a*-58*n*, such as spot toner levels 198 (e.g. 198*e*, 198*f* in FIG. 21). If any toner 58 becomes depleted to a level which could affect print quality, the client user is notified, either on an "as-needed" basis (regarding the user's current print jobs 18), or on an "as-requested" basis (regarding the requested toner status of any selected output device 40).

Figure 20:
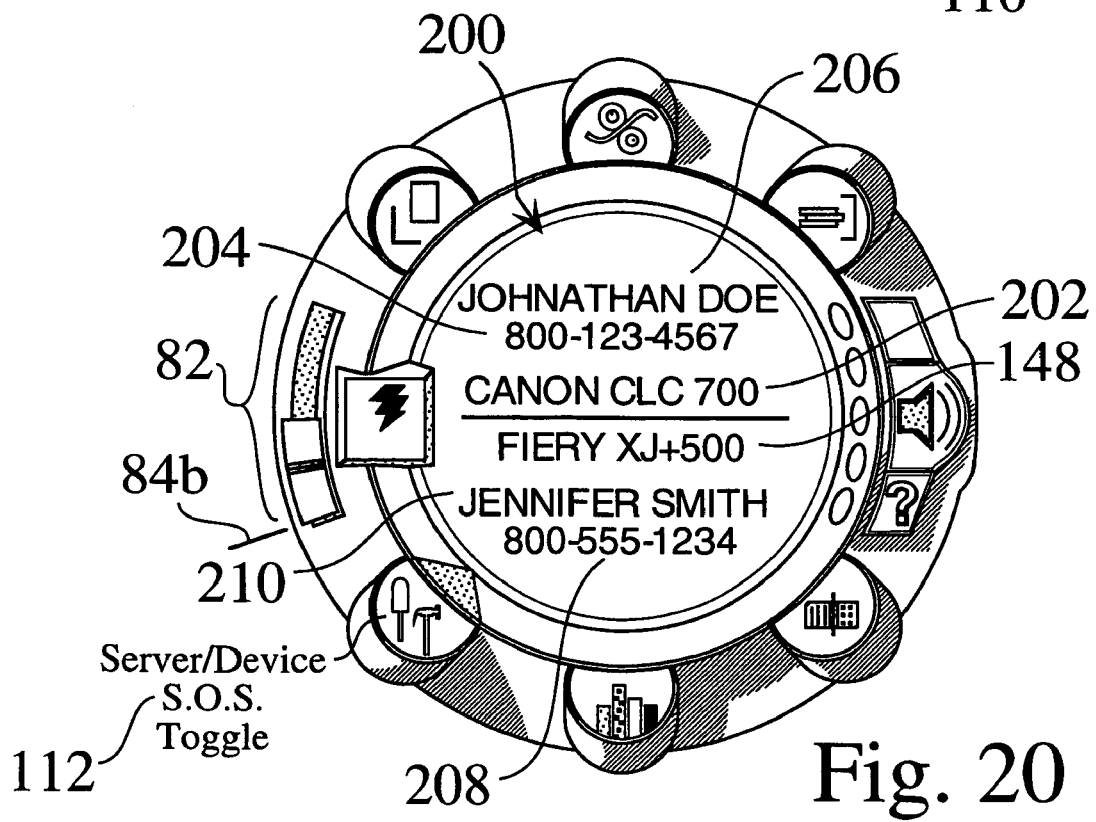
FIG. 20 is a print server and output device service information screen of an output peripheral device interface for a peripheral icon embodiment of a client print server link.

Print Server and Output Device Service Screen. Activation of the print server and output device service icon 112 switches the active screen to the print server and output device service screen 200, as shown in FIG. 20. The print server and output device service screen 200 displays service information for support or repair, such as output device model 202, output device service contact name 206, and output device service contact number 204, as well as print server model 148, print server service contact name 210, and print server service contact number 204. The service information provided by the print server and output device service screen 200 is particularly useful if and when a print server 32 or output peripheral device 40 crashes or won't print, wherein a client user may desire to call a copier service technician, or call a technical support service with a particular technical question. The information displayed on the service screen 200 is typically entered and maintained by an administrative user, either directly at each print server 32, or through an administrative print server application 26, as discussed below.

Job Tracking and Selection. The client print server link 16 keeps track of print jobs 18 which are selected to be printed by the user, using a print job indicator 91 (FIGS. 7-20). Each client user at a client computer 12 therefore can view and monitors information which is specific to each of their own print jobs 18.

Figure 22:
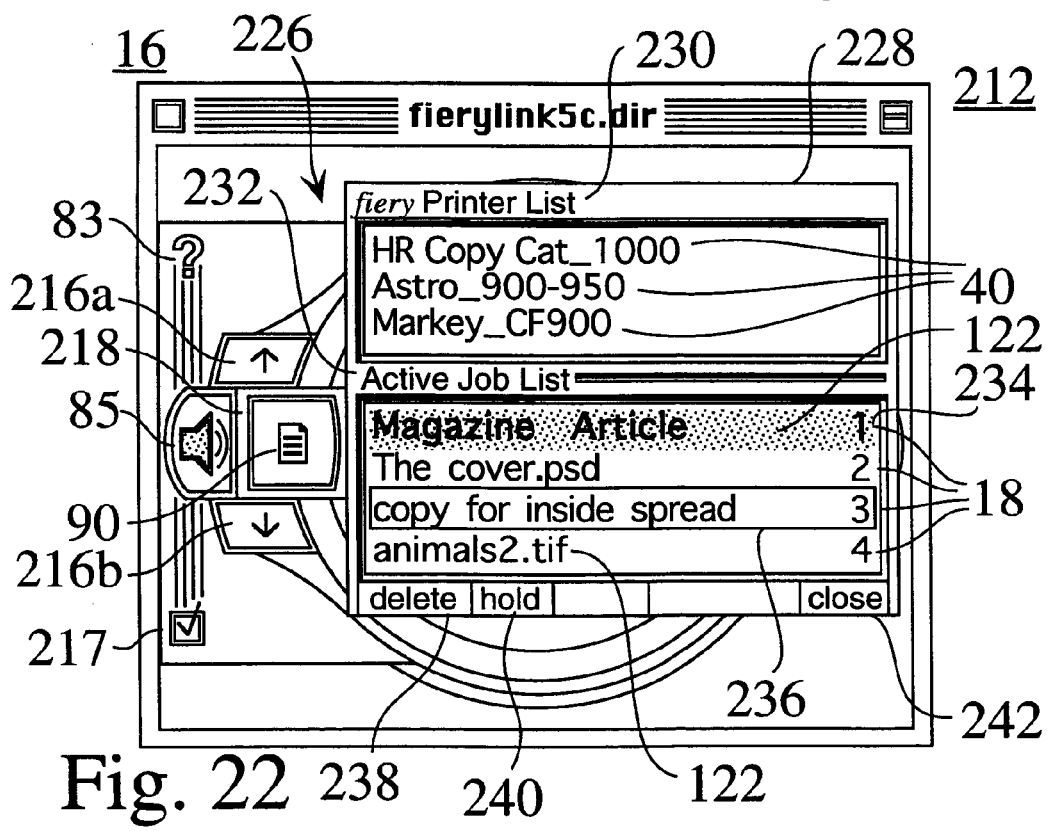
FIG. 22 is an output device list and active print job list information screen for a toggled embodiment of a client print server link.
Figure 25:
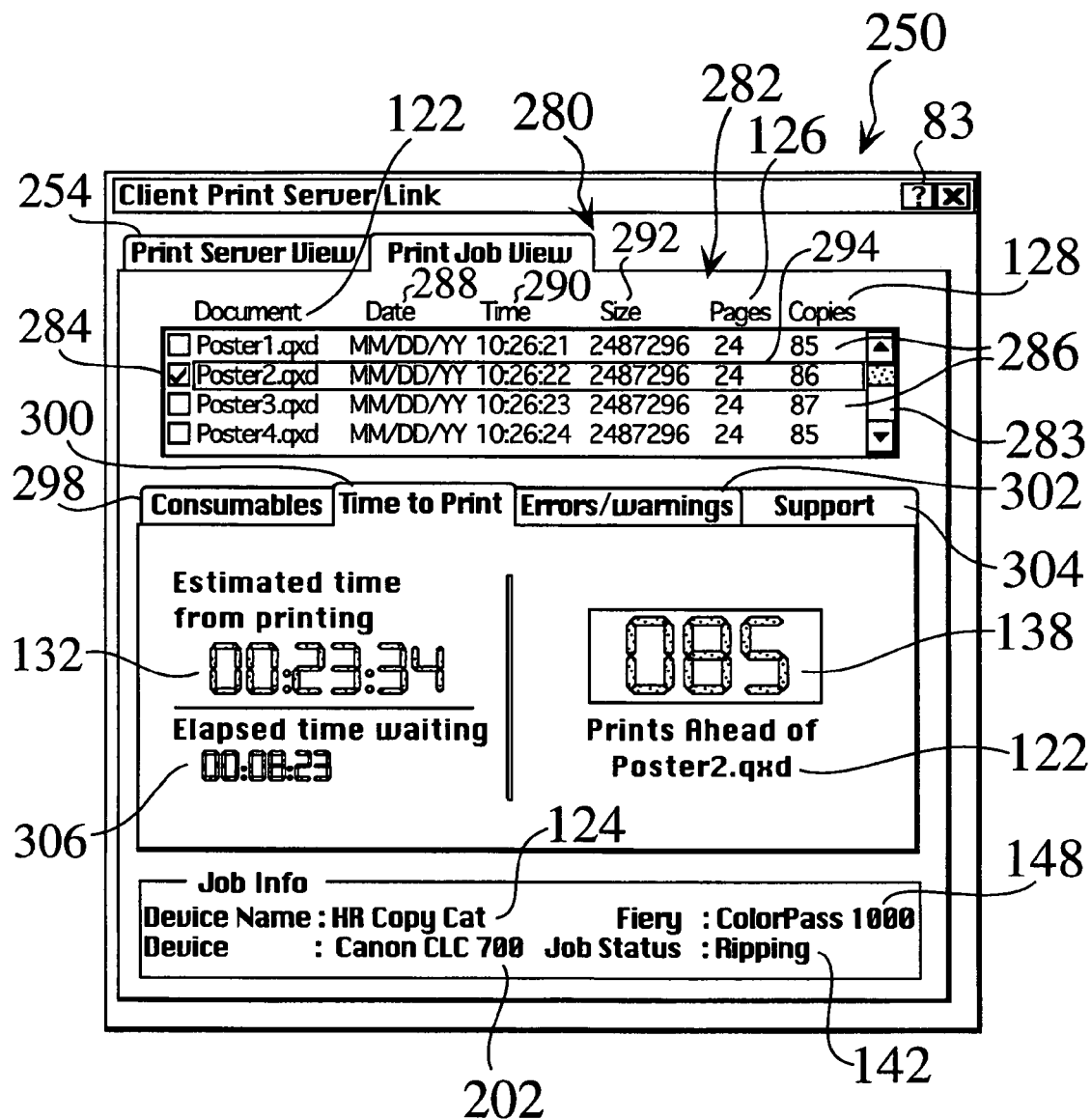
FIG. 25 is a print job display screen for a windowed embodiment of a client print server link.

In one embodiment of the peripheral icon embodiment of a client print server link 16, the print job indicator display 91 (FIGS. 7-20) shows information for the five most recent print jobs 18. Since most client users typically have only one or two current print jobs 18, a print job indicator 91 capable of tracking five print jobs 18 is typically sufficient (As seen in FIGS. 22, 25, as discussed below, the client print server link 16 can monitor any number of print jobs 18 for a client user).

In the print job indicator display 91, a highlighted job indicator 93 signifies the print job 18 which is currently monitored (e.g. the second indicator from the top of the print job indicator in FIGS. 7-11), while non-highlighted indicators 93 signify other print jobs 18 that are in the process of printing (e.g. the third and fourth indicators 93*c*, 93*d* from the top of the print job indicator display 91 in FIGS. 7-11). Blank indicators 93 (e.g. the first indicator 93*a* and the fifth indicator 93*e* from the top of the print job indicator 91 in FIGS. 7-11) typically signify print jobs 18 which have printed.

A displayed print job 18 in the client print server link 16 appears in one of the job indicator slots 93 located along the print job indicator display 91. In a preferred embodiment, the print job indicator display 91 emits audible tones when the status of any tracked print job 18 changes. Control of sound level and audible tone selection is set through sound control 85 (FIGS. 7-20).

Each of the client user's print jobs 18 are tracked, and remain in the same indicator slot position 93 of the print job indicator display 91 throughout the duration of the printing process. The order of the print jobs 18 in the indicator slots 93 is irrelevant, since the jobs 18 may finish printing in a different order than originally sent. For example, in a given time period, a first print job 18 is sent to a busy printer 40, a second print job is sent to an idle printer device 40, and a third print job 18 is sent to another busy printer device 40. In this example, the second print job 18 may RIP and print immediately, while the first and third print jobs 18 wait to RIP. In this case, the second slot 93*b* becomes vacant, while the first and third slots 93*a*, 93*c* are still occupied. When the user prints a fourth print job 18, the fourth job 18 typically appears in the first vacant slot 93, which in this example is the second slot 93*b*.

When the client user positions the mouse at a client computer 12 over an occupied indicator slot 93, that job's information is displayed on the screen 86 (the information displayed depends on the active peripheral icon, such as the state of file icon 96 (FIG. 12)). The print job 18 is selected by depressing the button on the occupied slot 93, and the job indicator slot 93 lights up to indicate that it has been selected. All client print server link functions then updated to reflect the properties of that selected job 18. The occupied slots work like radio buttons for selecting which print job 18 is to be monitored. In this embodiment of the client print server link 16, only one job 18 is selected at a time.

Error and Warning Display. As discussed above, the client print server link 16 displays all errors that arise on a "need-to-know" basis for the client user, regarding the operation of one or more relevant print servers 32 and any connected bi-directional output devices 40. Error messages are sent only to connected client users with outstanding print jobs 18 which are affected by a particular error condition within the printing system 10.

Depending on the severity of the error condition, the client print server link 16 promptly brings the error to the attention of the client user. In one embodiment, urgent error conditions are shown with a highlighted circle 172, such as a red circle 172 (FIG. 16), which surrounds the active display screen 86, accompanied by an audible alert. High priority errors are typically those in which printing at an output device 40 cannot proceed until the problem is solved. When printing can proceed, users are notified with a green circle 172, and the client print server link 16 returns back to the previous mode that was active before the error occurred.

Within each function screen, potential problems which may affect the print process are typically highlighted, such as in yellow and red detail or text color. For example, in FIG. 17, if the paper level of an output tray 64 exceeds a certain limit (e.g. tray "2"), the level display 184 is shown in red, and a "FULL" output tray message 186 appears in red, thus notifying the client user to empty the output tray 64, and allowing printing at the output device 40 to continue.

Optional Error Communication. Depending on the printing environment, either set up by a system administrator, or specified through the client print server link 16, a client user can accept responsibility for error conditions. During such an error condition, the responsible client user is notified that service of a particular output device 40 is required, while other client users that have print jobs 18 which are affected by the error condition are notified. In this manner, the client print server link 16 eliminates the common problem of multiple users consecutively attending to the same printing error at an output device 40.

Figure 21:
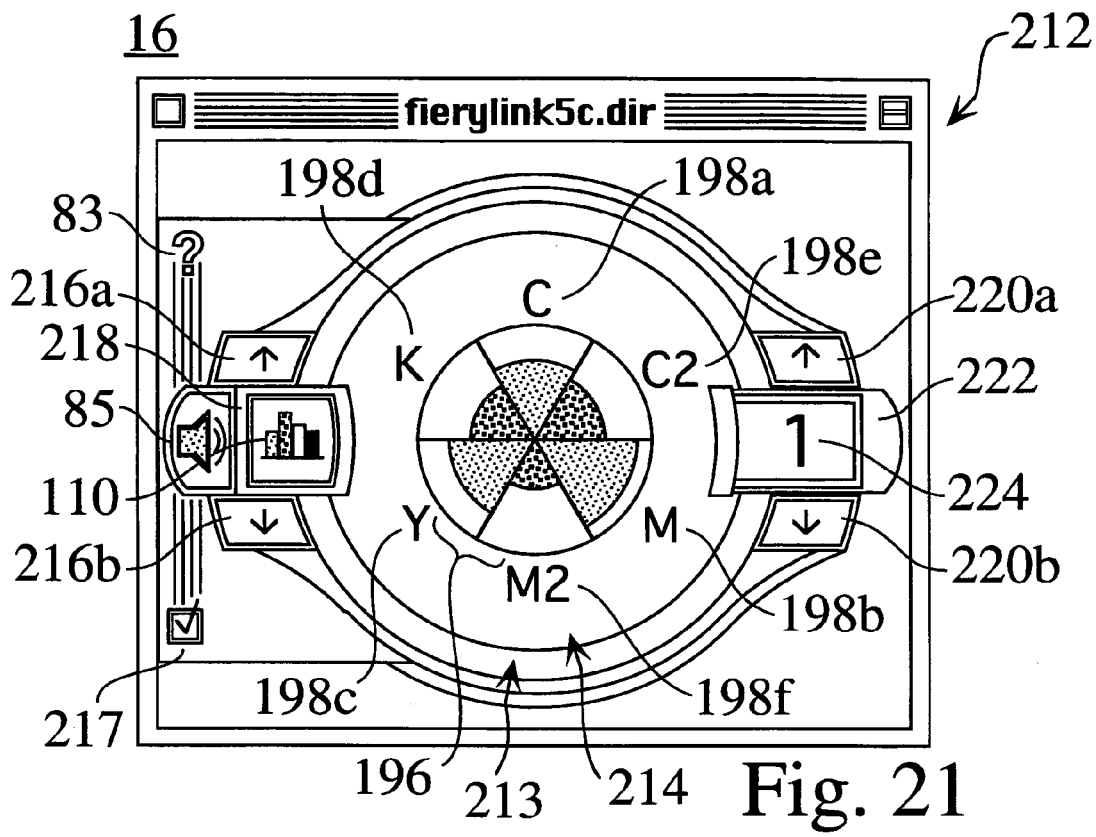
FIG. 21 is a toner levels information screen for a toggled embodiment of a client print server link.

Alternate Client Print Server Link Interface Embodiments. FIG. 21 is a toner levels information screen for a an alternate toggled interface embodiment 212 of a client print server link 16. The toggled interface 212 typically occupies only a small percentage of the monitor on a client computer 12 to display all relevant information regarding the active print jobs 18 for a client user.

The toggled interface 212 includes a tool icon display 218, and alternate tool toggles 216a, 216b. Activation of either tool toggles 216a or 216b sequentially shifts tool icons within tool icon display 218 (e.g. the toner icon 110 is currently displayed in FIG. 20). Tool icons which are typically available include paper input supply toggle 102, paper path toggle 104, a paper output tray toggle 106, a fuser life toggle 108, a toner/ink levels toggle 110, and a print server and output device S.O.S. toggle 112, such as shown in FIG. 8. It also toggles through print server oriented tools. As the client user toggles through the active tools in tool icon display 218 with tool toggles 216a or 216b, the display screen 213 actively displays information which is related to the active icon.

The toggled interface 212 also includes a print job icon display 222, and alternate print job toggles 220a,220b. Activation of either print job toggles 220a or 220b sequentially shifts the client user's print jobs 18 within print job icon display 222 (e.g. job icon 224 for the client user's print job "1" is currently displayed in FIG. 20).

The central display screen 213 intuitively displays information that is relevant to both the tool icon currently selected in tool icon display 218 and the job icon display 222. In FIG. 21, therefore, the central display 213 currently shows the toner display screen 214 (since the toner icon 110 is currently selected), and displays toner information 196 for the output device 40 which is currently selected for the client user's print job "1" (since the job icon 224 for print job "1" is currently selected in print job icon display 222).

From the central display 213 currently shown in FIG. 21, the client user can easily toggle the print job toggles 220a, 220b (to check toner levels information 196 regarding destination printers 40 for other print jobs 18, or can toggle the tool toggles 216a or 216b to view other information regarding the currently selected print job 18 (e.g. state of file information 96). Therefore, the toggled interface 212 of the client server link 16 selectively displays relevant information for the client user. The level of detailed information displayed is easily controlled by the user through the toggled interface 212.

As discussed above for other embodiments of the client print server link 16, the toggled interface 212 of the client server link 16 provides information to a client user in either an "as needed", or in an "as requested" basis. Context sensitive help is also available, through help button 83. A preference button 217 is also provided.

The toggled interface 212 of the client server link 16 provides different levels of information and control for different client users. For example, a novice client user can use the toggled interface 212 of the client print server link 16 to display and control only basic information, such as the destination printer 40 and print controls. For a novice user, the toggled interface 212 of the client server link 16 provides basic control and information for each print job 18.

The same toggled interface 212 of the client server link 16 also provides detailed information and control for a sophisticated client user on an "as requested" basis. Such a sophisticated client user can selectively "preflight" a print job 18, by checking the status of potential print servers 32 and output devices 40, including the status of RIP queues 78, print queues 79, toner levels 198a-198n, input paper supplies 168, 170, and fuser level 190, 192. With this knowledge, a sophisticated client user can plan whether or not the desired output device 40 has a high probability of printing the print job 18 without encountering problems.

If a client user detects problems with a desired destination device 40, such as a low paper supply, the client user can choose from alternatives, such as replenishing paper or toner supplies in the desired device 40, routing a print job 18 to another output device 40 in a multiple output device system 10, or delaying or canceling the print job 18. For example, if a first desired printing device 40 has a low paper supply 168, 170, and the client user does not have time to replenish the paper in the first device 40a, the client user can check the paper 168, 170 and toner levels 198 in a second, alternate output device 40b.

In another example, for a first device 40a that provides high quality output to a system 10 of multiple client users, the print queue position 138 (FIG. 11) can be quite long, due to high demand from other users (thus delaying the client user's print job 18). The client user can detect a long print queue 138 through the client print server link 16, and can find another output device (e.g. 40n) which the selected print job 18 may be sent to for printing sooner.

In the toggled embodiment 212 of the client print server link, the tool bar 218 and toggled tool icons change depending on which print server 32 and connected output device 40 are currently selected for the print job 18, which is indicated on the print job indicator 224.

In most embodiments of the toggled embodiment 212 of the client print server link 16, each tool icon shown on tool display 218 typically represents only valid tools, and would typically not show absent tools. For example, for an output color printer 40 that includes multiple toner cartridges 58a-58n (FIG. 4), but does not provide toner levels information 74c (FIG. 5), the toggled interface 212a would not typically include an icon 110 for toner display 214. In such an embodiment, as the client user toggles through the available tools 218 using tool toggles 216a,216b, the toner information icon 110 and associated toner information screen 214 do not show up.

In an alternate embodiment, disabled menu tools icons 218 are shown as grayed out on the tool bar 218, as the user toggles through the available tools 218 using tool toggles 216a,216b.

Therefore, the toggled embodiment 212 of the client print server link typically provides a "device" driven icon tool system through tool control 218 and tool toggles 216a,216b, which is inherently expandable and flexible.

FIG. 22 shows a file information screen 226 for the toggled embodiment 212 of a client print server link 16. Activation of the file information icon 90 in the active tool icon display 218 provides a significant amount of information to the client user within a file control pop-up screen 228, including a printer list 230 of output devices 40 available to the client computer 12 on the network 30, and an active job list 232, which includes a scrollable list for the client user's print jobs 18. The scrollable active job list 232 allows any number of print jobs 18 to be tracked from the client toggled print server link 16. In the active job list 232 shown, job number "1", named "Magazine Article" is highlighted 234 (such as in bold text or a background fill color), which indicates that the print job 18 is the active print job 18 (as shown in active job icon 224 in job display 222 (FIG. 21). Print job number "3" in the active job list 228, whose file name is "copy for inside spread", is shown as outlined 236, which indicates that the print job 18 has been printed.

The auto-scrollable active job list 232 shows the temporary identification number of print job 18 of the job that is still processing. When the file information screen 226 is open, activation of the tool toggles 216a and 216b move through information for each of the print jobs 18, in a stacking order. As one print job 18 is printed (and is thus removed from the stacking order of remaining print jobs 18), the remaining active print jobs 18 are shifted in the current stacking order. The displayed number (e.g. "1" for "Magazine Article") signifies the current position of each print job in the active job list 232. While the user is moves up (by toggling button 216a) or down (by toggling button 216b) through the display stack list 232, information for each active print job 18 is provided to the client user, such as by highlighting of the destination output device 40 in the printer list 230.

The file information screen 226 also includes a delete button 238 for canceling a selected print job 18, a hold button 238 for holding a selected print job 18 (typically for printing at a later time), and a close button 242, for closing the detailed file control pop-up screen 228 in the file information screen 226.

Figure 23:
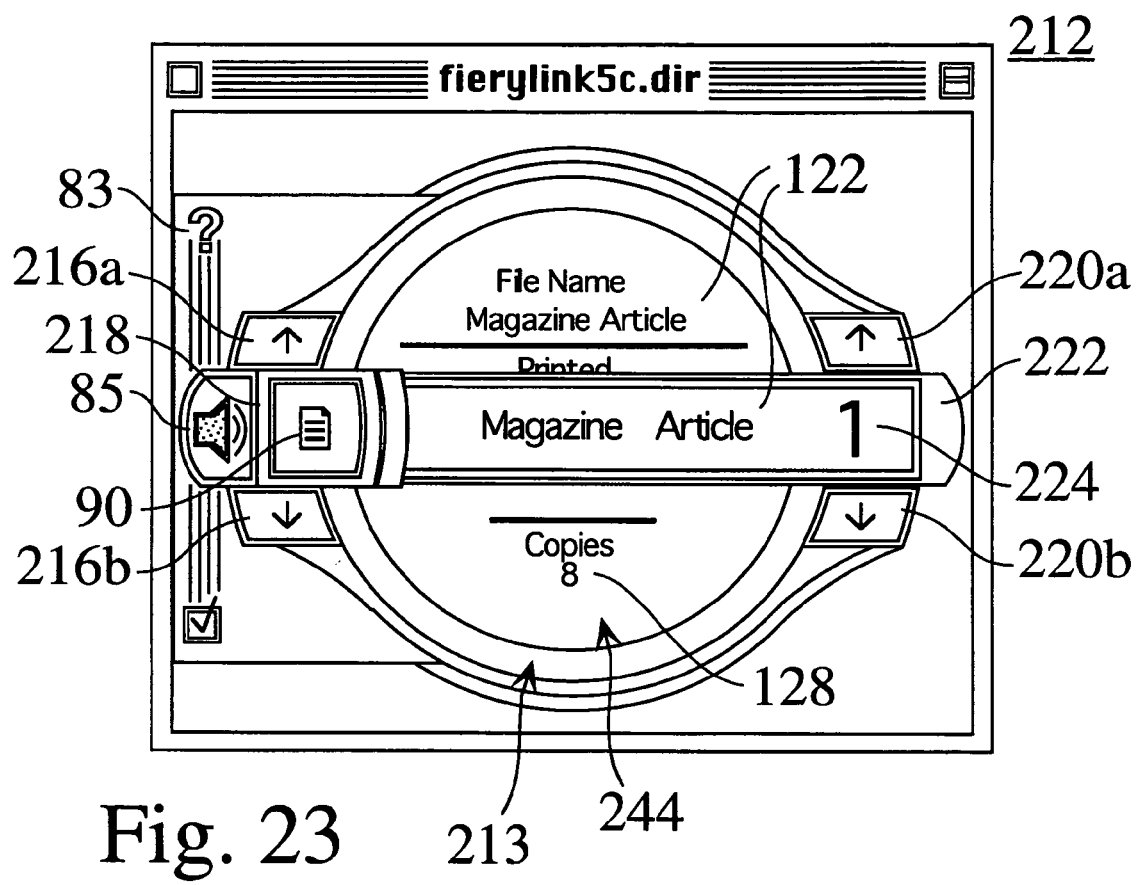
FIG. 23 is an file information screen for a toggled embodiment of a client print server link.

FIG. 23 is a single print file information screen 244 for a toggled embodiment 212 of a client print server link 16. When a client user toggles through the active tool icon screen 218 to the active file information icon 90, file information regarding the selected active print job 18 is displayed in the active display screen 213. The active print job 18 is highlighted in the active print job icon 224 (in FIG. 23, this is print job "1" in the current stacking order). The active print display 222 expands when the client user toggles the active print job icon 224, showing the file name 122 of the current selected print job 18. Information shown on the active display screen 213 is similar to the file information shown in FIG. 9, and includes information such as file name 122, output device name 124, print job pages 126, print job copies 128, and current print status 142 (FIG. 12), such as "waiting to print", "RIPing", or "held in queue".

Figure 24:
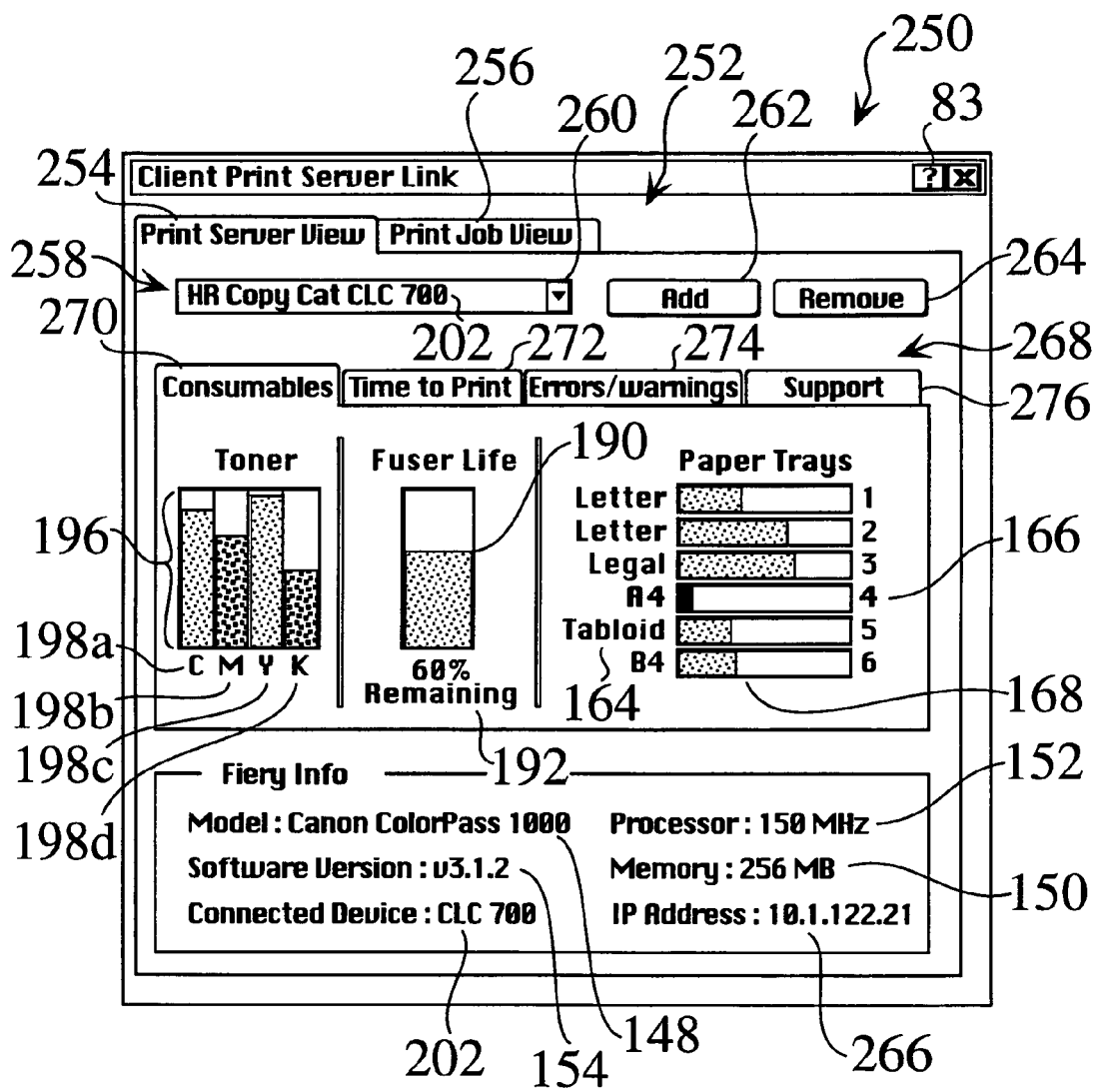
FIG. 24 is a print server and connected output device display screen for a windowed embodiment of a client print server link.

Windowed Embodiment of Client Print Server Link. FIG. 24 shows a print server and connected output device display screen 252 for a windowed embodiment 250 of a client print server link 16. The windowed embodiment 250 typically presents information to the client user in a tiled, report based format. The peripheral icon 80 and the toggled icon 212 embodiments of the client print server link 16, as discussed above, typically offer focused information screens for the client user, while the windowed embodiment 250 of the client print server link 16 typically displays comprehensive information to the client user on each display screen.

FIG. 24 shows an active print server and connected output device display screen 252, which is activated by print server view tab 254. The print job screen 280 (FIG. 25) is accessible by activation of print job view tab 256. The print server and connected output device display screen 252 includes a menu driven output device selector 258 having a pop-up selector control 260. The client user can select information for an output device 40 connected to the network 30, by using pop-up selector control 260. The name or identifier 202 for the selected device 40 (e.g. "HR Copy Cat CLC 700") is displayed in the output device selector 258. The print server and connected output device display screen 252 also includes an output device add button 262 (to add connected devices to the output device selector menu 258), and a print server remove button 264 (to remove output devices to the output device selector menu 258).

For a selected output device 40 (e.g. "HR CopyCat CLC 700" in FIG. 24), information regarding the connected output device 40 and it's print server 32 is itemized in a report format, with information such as print server model 148 (FIG. 13), print server processor 152 (FIG. 13), print server software version 154 (FIG. 13), print server memory 150 (FIG. 13), connected output device model 202 (FIG. 20), and network IP address 266.

The connected output device display screen 252 includes a report submenu display 268, having a consumables screen 270, a time to print screen 272, an errors and warnings screen 274, and a support screen 276. The consumables screen 270 is currently selected, and includes toner information 196, such as toner levels 198a-198n, fuser level information, such as a toner level display 190 and a toner percent remaining display 192, and input tray information 164, such as paper size in one or more tray locations 50a-50n (FIG. 4), the currently selected input paper tray 166, and an estimate 168 of paper supply for each installed input tray 50.

FIG. 25 is a print job display screen 280 for a windowed embodiment 250 of a client print server link 16. As discussed above, the print job display screen 280 is accessible by activation of print job view tab 256. The print job display screen 280 includes a menu driven print job list 282 having a job selector control 284 and an auto-scroll control 283. The client user can select and display information for each of the client user's print jobs 18, by using job selector control 284, or by "double-clicking" on the desired document row 286. Each row 286 in the print job list 282 includes identifying information for a print job 18, such as document name 122 (FIGS. 9, 11), document date 288, document time 290, document size 292, document pages 126 (FIG. 9), and copies to be printed 128 (FIG. 9).

The currently selected print job 18 is highlighted 294 (e.g. "Poster2.qxd" in FIG. 25). For a selected print job 18, information regarding the destination output device 40 and connected print server 32 is displayed in a report format, and typically includes print server model 148 (FIG. 13), destination output device model 202 (FIG. 20), destination output device name 124 (FIG. 9), and current job status 142 (FIG. 12).

The print job display screen 280 also includes a print job report submenu display 296, having a print job consumables screen 298, a print job time to print screen 300, a print job errors and warnings screen 302, and a print job support screen 302. The print job display screen 280, while similar to the connected output device display screen 252 (FIG. 24), contains information relevant to a particular selected print job 18. The currently selected print job time to print screen 300 shows an estimated time from printing 132 (FIG. 10), an elapsed time waiting 306, and position in queue 138 (FIG. 11) for the selected print job 18 having file name 122.

While a print system 10a having client print server links 16 does not use an administrative print server link 26, as seen in FIG. 1, preferred system embodiments, such as systems 10a, 10b, use one or more administrative print server links 26 to provide system integration and control. The administrative print server link 26 can be located anywhere on the network 30, and is linked to one or more fiery print servers 32a-32n through the network 30. An administrative user at an administrative computer 24 logs onto print servers 32a-32n from the administrative print server link 26. The administrative print server link 26 can also be connected directly to a single print server (e.g. print server 32a), while communicating with other print servers (e.g. print servers 32b-n) (through the network 30. As well, the administrative print server link 26 can also be used in printing systems 10 which do not use client print server links 26 at client computers 12a-12n.

The administrative print server link 26 gathers information from each print server 32 regarding the status of all print jobs 18, and the status of each connected output device 40. In the administrative print server link 26, every time something changes to the print queue 79 of any print server 32, the change is sent to the administrative print server link 26, and the print queue 79 is updated. While not all information may be sent through the two-way communication protocol (such as for print servers 32 or output peripherals that do not support SNMP, as discussed above), the administrative print server link 26 is still able to integrate such information, by emulating the available information from each print server 32a-32n.

Figure 26:
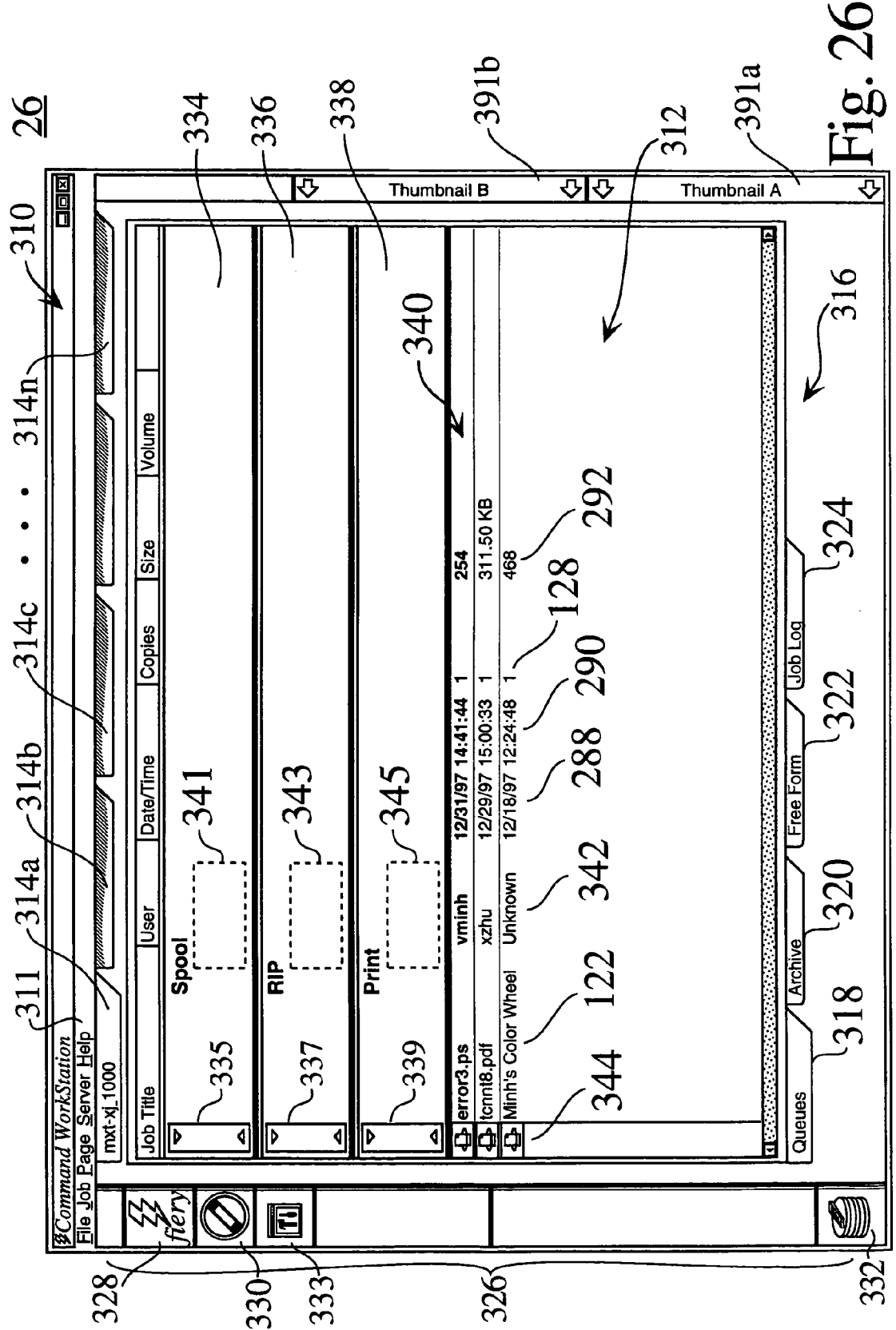
FIG. 26 is a print job queue information screen of a print server and output peripheral device interface for an administrative print server link application.

Administrative Print Server Link Interface. FIG. 26 is a print job queue information screen 312 of a print server and output peripheral device interface 310 for an administrative print server link application 26. The administrative print server link 26 allows administrative users to monitor and manage print jobs 18 from one or more client users. The administrative print server link 26 can be located at a computer anywhere within the printing system 10, such as at a computer workstation 24 connected directly to one of the print servers 32, or from a desktop computer 12 or computer workstation 24 connected to the network 30. The administrative user can monitor one or more print servers 32a-32n, and can manage the print jobs 18 on one or more output devices 40 connected to each of the print servers 32a-32n.

The print server and output peripheral device interface 310 for the administrative print server link application 26 includes print server selector tabs 314a-314n, which are user-selectable to selectively display information and control for each administrative print server 32 and connected output device 40.

The information window 316 is located beneath menu control 311 and selector tabs 314a-314n. The information window 316 is resizable, and displays a queue information layer 318 (the active information layer in FIG. 25), an archive information layer 320, a freeform information layer, and a job log information layer 324. In a similar manner to the information available to client users within a client print server link 16, administrative users can access output device information, such as paper levels 168, 170 (FIG. 14) and toner levels 198 (FIGS. 18,20) for an output device 40, by clicking on one of the selector tabs 314a-314n at the top of the information window 316. The selector tabs 314a-314n indicate which of the connected print servers 32 is currently displayed on the interface screen 316. In alternate embodiments, the administrative print server link 26 interface has a toggle to alternately display information from a large number of print servers 32.

Figure 29:
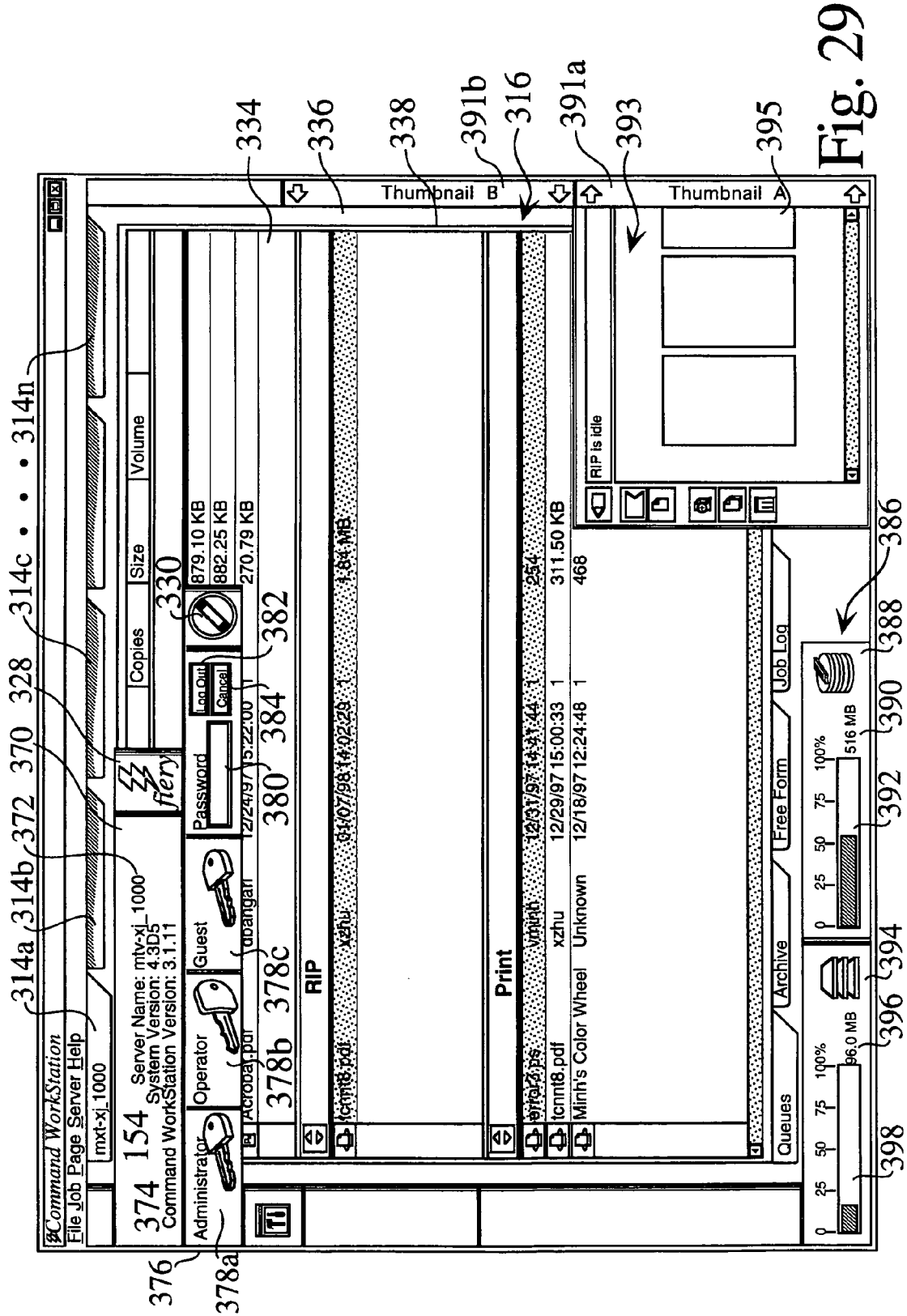
FIG. 29 shows information and access screens for an administrative print server link application.

The system information bar 326 within the interface 310 provides access to system software information 370, log-on information 376, hardware information 332, and to service information 333 (FIG. 29).

Activation of the log in button 330 launches the log-in slider bar 376, as shown in FIG. 29. The password level 378 (e.g. Administrator 378a, Operator 378b, or Guest 378c) is selected from the log-in slider bar 376, and determines which level of privileges the user of the administrative print server link 26 has, when logged into the selected print server 32 (e.g. "mxt-xj__1000"). The log-in slider bar 376 also includes a password entry window 380, a log out control button 382, and an access cancel button 384.

The print server hardware button 332 launches a slider 386 which displays hard disk information 388, such as total hard disk space 390 and hard disk space availability 392. The hardware slider also displays random access memory (RAM) information, such as total installed RAM 396 and RAM availability 398.

When a client user issues a "Print" command from an application on a desktop client computer 12a-12n (FIGS. 1,2), or from a client print server link 16, the file 18 is sent through the network 30 to the print server 32, such as a Fiery print server 32, connected to the destination output device 40. The administrative print server link 26 allows an administrative user, such as a printer operator or system administrator, to track the progress of all print jobs 18 from client computers 12a-12n, by monitoring the spool queue display 334, the RIP queue display 336, and the print queue display 338.

The size of the title bars for the spool queue display 334, the RIP queue display 336, and the print queue display 338 can be shrunk or expanded, using spool queue title bar control 335, RIP queue title bar control 337, and print queue title bar control 339. The size of the title bars is controlled, either to preserve screen space, or to make them visible to an operator standing several feet from the administrative workstation 24. As well, the queue displays are resizable and scrollable. In a preferred embodiment, the title bars for the spool queue display 334, the RIP queue display 336, and the print queue display 338 also include animations 341,343, and 345 to indicate system activity (similar to the activity animations available to the client print server link 16 in FIGS. 12 and 16).

Figure 27:
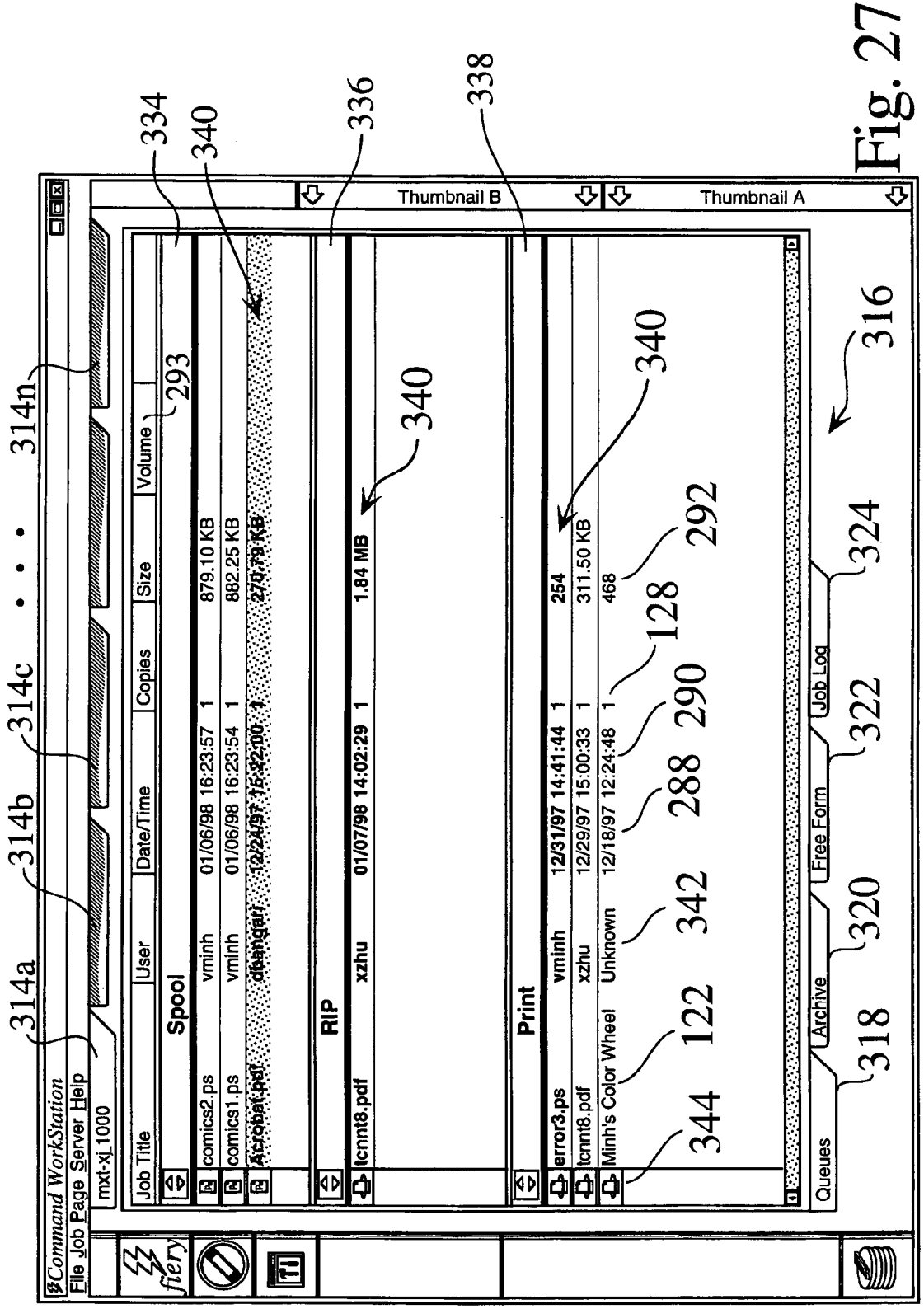
FIG. 27 is a combined queue information screen of an administrative print server link application.

FIG. 27 is an expanded queue information screen of an administrative print server link application 26. As discussed above, an administrative user can selectively expand and contract the title bars and the spool queue display 334, the RIP queue display 336, and the print queue display 338 within the print job queue information screen 312 of the print server and output peripheral device interface 310. When a client user sends a print job 18 to be printed from a client computer, the print jobs 18 are first sent to the spool queue 77 at a print server 32 connected to the destination output device 40. Print files which are currently located in the spool queue 77 (FIG. 6) are displayed in the spool queue display 334. Print job files 18 located within the spool queue 77 wait to be processed (RIPped) by the print server 32.

The job entry line 340 for each print job 18 (in either the spool queue display 334, the RIP queue display 336, or the print queue display 338) provides the administrative user with information about the print job 18 to be printed, such as document name 122, client user identification 342, document date 288 (FIG. 25), document time 290, copies 128, document size 292, and volume 293. If the selected print server 32 is driving more than one output device 40, the displayed job entry number 340 indicates the destination output device 40 for the print job file 18. The administrative user can configure which information is included in the job entry line 340. The job entry line 340 for the currently selected print job 18 in the spool queue display 334 is highlighted 346. The administrative user can quickly display more details regarding the selected print job 18, and can control the processing and storage of each print job 18.

Print files which are currently located in the RIP queue 78 of a print server 32 (FIG. 6) are displayed in the RIP queue display 336 (e.g. document "tcnn8.pdf" 122, from user "xzhu" in FIG. 27). Files arriving in the RIP queue 78 are typically translated into raster data, so that the destination copier/printer 40 can print the file 18. Administrative users may choose to retain the file 18 within the RIP queue 78, such as for printing at a later time, or can send the file 18 immediately to the output device 40 after processing.

The print queue 79 (FIG. 6), as indicated in the print queue display 338, includes print job files 18 that are currently printing or have been printed. The administrative user can configure the administrative print server link application 26 to select how many files 18 are saved in the print queue 338 at any given time.

Figure 28:
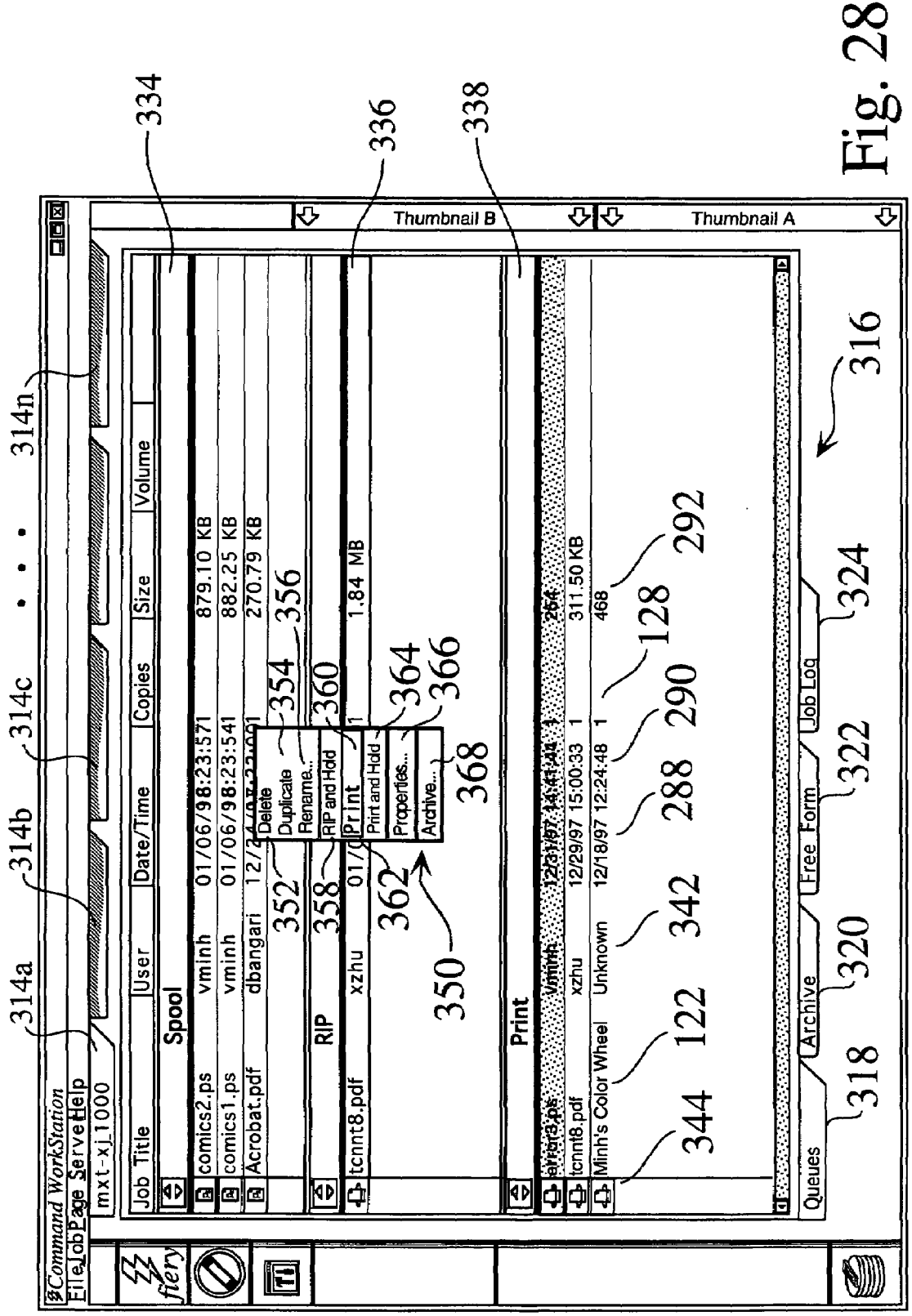
FIG. 28 shows a selectable pop-up control option menu for a combined spool queue information screen of an administrative print server link application.

FIG. 28 shows a selectable pop-up control option menu 350 for an expanded queue information screen 312 of an administrative print server link application 26. The selectable pop-up control option menu 350 is accessible from a highlighted job entry line 340 for the spool queue display 334, the RIP queue display 336, and the print queue display 338 within the print job queue information screen 312 of the print server and output peripheral device interface 310. The selectable pop-up control option menu 350 provides an administrative user with control and display of parameters for selected print job files 18. For example, the selectable pop-up control option menu 350 shown for the highlighted job entry line 340 in the spool queue display 334 of FIG. 28 indicates print job delete 352, print job duplicate 354, print job rename 356, RIP and hold control 358, print control 360 (currently selected with control option selection 362), print and hold control 364, print job properties submenu control 366, and archive submenu control 368. The administrative print server link 26 provides an administrative user with a great deal of information and control over a print system 10. For example, an administrative user can hold a print job 18 for printing at a later time, such as for a print job which requires blue paper 51, if there is currently no supply of blue paper 51.

In a preferred embodiment, the system administrator may also use the client print server link 16, such as to monitor toner levels on a number of output devices 40. In another preferred embodiment, the administrative print server link 26 includes the functionality of the client print server link 16, whereby the fiery link screens are included within the administrative print server link 26.

FIG. 29 shows administrative information and access screens for an administrative print server link application 26. Clicking on the print server button 328 launches a slider bar 370 (FIG. 28), which displays the print server name 372, print server system software version number 154, and administrative print server (command workstation) link software version number 374. Selection of a print job 18 within a highlighted job entry line 340, within either the spool queue display 334, the RIP queue display 336, or the print queue display 338 allows an administrator to display thumbnail information for the selected print job 18. Activation of a "thumbnail" button 391a or 391b activates a slider 393 containing thumbnail previews of the pages within the selected print job 18. Administrative users can "drag and drop" pages to copy, delete, or re-order them. Double-clicking on a page within the thumbnail window 395 activates a full-screen preview of the page.

Figure 30:
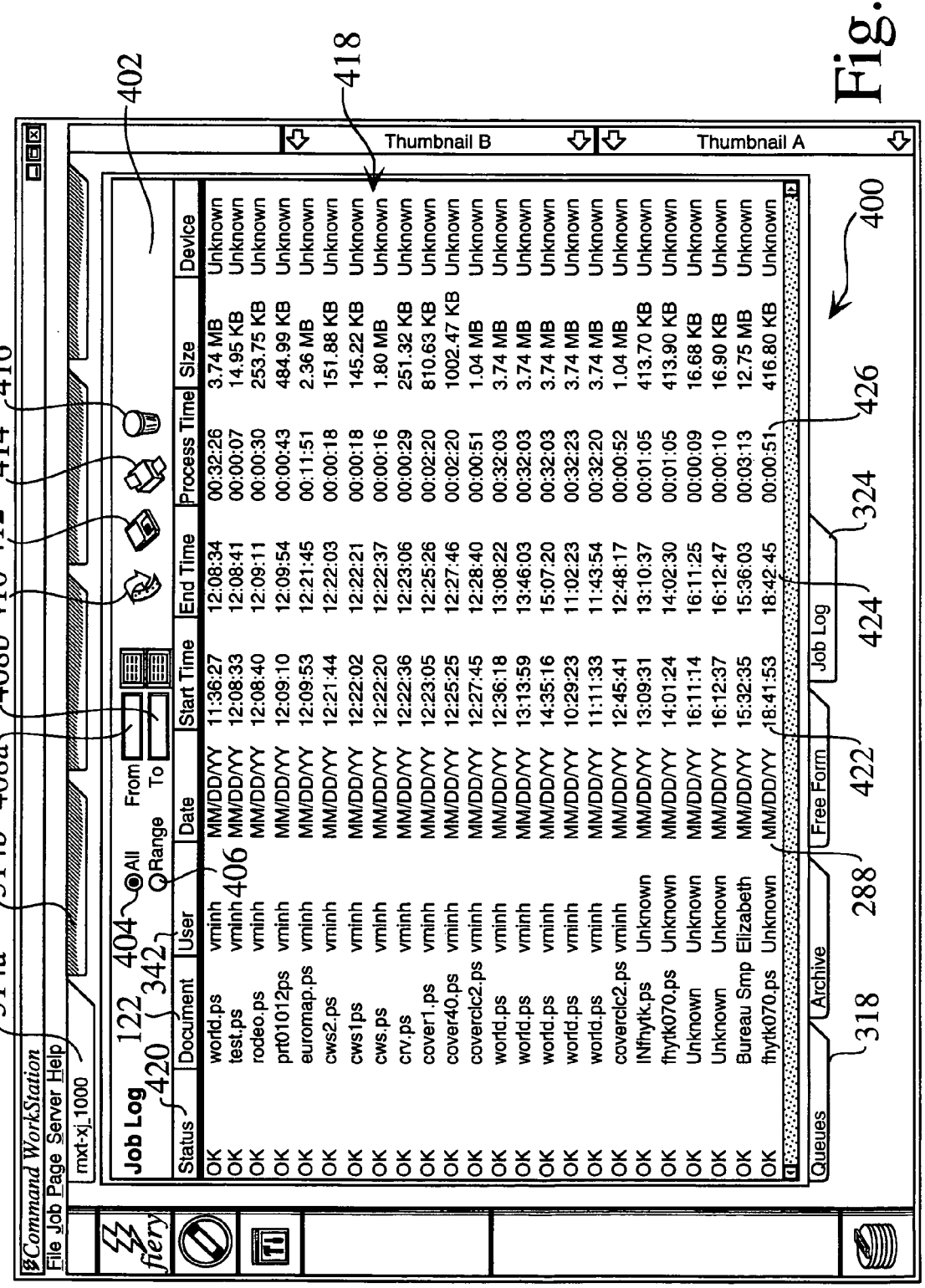
FIG. 30 is a job log information screen of an administrative print server link application.

FIG. 30 is a job log information screen 324 of an administrative print server link application 26. The job log information screen 324 includes detailed information regarding each print job 18, and is typically displayed within a job log list 400. The print jobs 18 to be displayed within the job log list 400 are controllable with a job log list selector 402, which can include all print jobs 18, by activation of radio-control button 404, and can be selected from a range, by activation of range radio-control button 406 and range selection windows 408a, 408b. Other administrative job log controls include update list 410, store to disk control 412, print job list control 414, and delete selected job control 416. The content and order of job list information within job list entry lines 418 is selectable by the administrative user, and typically includes print job status 420, document name 122, client user identifier 342, document date 288, document start time 422, document end time 424, document process time 426, document size 292, and output device 40.

In a printing system having one or more administrative print server links 26, as well as client print server links 16 at client computers 12a-12n, the administrative print server link 26 provides job management on a global level for a system administrator, while the client print server links 16 provides job management on a user level for each client user.

Preferred Command Workstation Features. On a preferred embodiment, the administrative print server link 26 allows an administrative user to build new documents from one or more print jobs 18, or can move pages from one document to another document, such as in thumbprint control window 393 (FIG. 29).

Both the client print server link 16 and the administrative print server link 24 can be located on the same computer 12,24. In a network environment 10, a user can perform administrative tasks from a single location, using the administrative print server link 24, while also performing tasks as a client user, such as creating and modifying documents 18 from within applications, and managing their own printing tasks using a client print server link 16. For example, a client user can run applications and send print files 18 from a client computer, while logging onto connected print servers 32 and performing administrative tasks, such as overseeing or modifying print queues.

The same user may have both the client print server link 16 and the administrative print server link 26, and find them both useful. The user can use the client print server link 16 for the detailed display of information regarding their own print jobs 18, and information regarding print servers 32, and output devices 40. The same user, preferably having password protected accessibility, can use the administrative print server link 26 to perform more powerful administrative tasks, such as reordering print queues between several users, or deleting print jobs 18.

Although the client print server link 16 and the administrative print server link 26 and methods of use are described herein in connection with computer networks 30, servers 32, and output devices 40, such as printers and copiers, the techniques can be implemented for other networked printing and copying environments, or any combination thereof, as desired. As well, while the client print server link 16 and the administrative print server link 26 are described using a single administrative print server link 26, any number of administrative print server links 26 may be used.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A printing system comprising:
   a network;

a plurality of output printing devices coupled to the network, each output printing device comprising status information;

a client computer coupled to the network; and an application adapted to run on the client computer, wherein the application is adapted to submit a first print job to a first output printing device and a second print job to a second output printing device, receive the status information regarding the output printing devices, determine which of the received status information is relevant to the first and second print jobs, filter the status information to extract the status information relevant to the first and second print jobs, and group and display the filtered status information regarding the first and second output printing devices.

2. The printing system of claim 1, wherein the output printing devices comprise a printer.

3. The printing system of claim 1, wherein the output printing devices comprise a copier.

4. The printing system of claim 1, wherein the status information comprises paper input tray information.

5. The printing system of claim 1, wherein the status information comprises toner level information.

6. The printing system of claim 1, wherein the status information comprises fuser level information.

7. The printing system of claim 1, wherein the status information comprises paper output tray information.

8. The printing system of claim 1, wherein the status information comprises output printing device service information.

* * * * *